United States Patent
Suzuki

(10) Patent No.: US 11,008,961 B2
(45) Date of Patent: May 18, 2021

(54) INTERNAL COMBUSTION ENGINE CONTROL SYSTEM

(71) Applicant: DENSO CORPORATION, Kariya (JP)

(72) Inventor: Yusaku Suzuki, Kariya (JP)

(73) Assignee: DENSO CORPORATION, Kariya (JP)

(*) Notice: Subject to any disclaimer, the term of this patent is extended or adjusted under 35 U.S.C. 154(b) by 2 days.

(21) Appl. No.: 16/751,840

(22) Filed: Jan. 24, 2020

(65) Prior Publication Data

US 2020/0158036 A1 May 21, 2020

Related U.S. Application Data

(63) Continuation of application No. PCT/JP2018/024217, filed on Jun. 26, 2018.

(30) Foreign Application Priority Data

Jul. 28, 2017 (JP) .............................. JP2017-146908

(51) Int. Cl.
 *F02D 41/00* (2006.01)
 *F02D 13/02* (2006.01)
 *F02D 37/02* (2006.01)

(52) U.S. Cl.
 CPC ..... *F02D 41/0002* (2013.01); *F02D 13/0261* (2013.01); *F02D 37/02* (2013.01);
(Continued)

(58) Field of Classification Search
 CPC .. F02D 41/0002; F02D 13/0261; F02D 37/02; F02D 41/0087; F02D 2041/001;
(Continued)

(56) References Cited

U.S. PATENT DOCUMENTS 7,970,524 B2   6/2011 Gruenter
2005/0000276 A1   1/2005 Bauer et al.
(Continued)

FOREIGN PATENT DOCUMENTS

JP   2002-221068   8/2002
JP   2002221068 A * 8/2002
(Continued)

OTHER PUBLICATIONS

Ueda—Torque Control Device of Internal Combustion Engine—JP-2002221068-A—English Translation (Year: 2002).*
(Continued)

*Primary Examiner* — Joseph J Dallo
*Assistant Examiner* — Scott A Reinbold
(74) *Attorney, Agent, or Firm* — Nixon & Vanderhye P.C.

(57) ABSTRACT

A control arithmetic unit uses a control storage area to compute a target control amount for combustion of an internal combustion engine according to a user required torque. A monitoring arithmetic unit uses a monitoring storage area to perform computation and to monitor presence or absence of a torque anomaly state in which an estimated torque is deviated from an engine required torque by a predetermined amount or more. The monitoring arithmetic unit computes the estimated torque by using a blow through state amount. The blow through state amount is a quantity of intake air blowing through out of an exhaust port in an intake stroke of the internal combustion engine, a degree to which intake air blows through out of the exhaust port, or an in-cylinder air quantity which is a quantity of air filled into a combustion chamber of the internal combustion engine.

18 Claims, 13 Drawing Sheets

(52) U.S. Cl.
CPC .... *F02D 41/0087* (2013.01); *F02D 2041/001* (2013.01); *F02D 2200/0406* (2013.01); *F02D 2250/18* (2013.01)

(58) Field of Classification Search
CPC ......... F02D 2200/0406; F02D 2250/18; F02D 45/00
USPC ....................................................... 701/102
See application file for complete search history.

(56) References Cited

U.S. PATENT DOCUMENTS

| | | | |
|---|---|---|---|
| 2006/0293833 A1* | 12/2006 | Ushijima | G05B 23/0235 701/114 |
| 2010/0036558 A1* | 2/2010 | Murakami | F02D 41/22 701/31.4 |
| 2015/0184606 A1 | 7/2015 | Soejima et al. | |

FOREIGN PATENT DOCUMENTS

| | | |
|---|---|---|
| JP | 2011-32903 | 2/2011 |
| JP | 2011032903 A * | 2/2011 |
| JP | 2017-15062 | 1/2017 |
| WO | 2019/021721 | 1/2019 |
| WO | 2019/026545 | 2/2019 |

OTHER PUBLICATIONS

Saito—Control Device of Vehicle—JP 2011-32903-A—English Translation (Year: 2011).*
U.S. Appl. No. 16/751,800 to Suzuki, titled "Internal Combustion Engine Control System", filed Jan. 24, 2020 (52 pages).
U.S. Appl. No. 16/775,651 to Goto, titled "Torque Monitoring Device", filed Jan. 29, 2020 (42 pages).

* cited by examiner

US 11,008,961 B2

INTERNAL COMBUSTION ENGINE CONTROL SYSTEM

CROSS REFERENCE TO RELATED APPLICATION

The present application is a continuation application of International Patent Application No. PCT/JP2018/024217 filed on Jun. 26, 2018, which designated the U.S. and claims the benefit of priority from Japanese Patent Application No. 2017-146908 filed on Jul. 28, 2017. The entire disclosures of all of the above applications are incorporated herein by reference.

TECHNICAL FIELD

The present disclosure relates to an internal combustion engine control system.

BACKGROUND ART

Conventionally, an internal combustion engine is equipped with an apparatus to monitor a state of the internal combustion engine and to control an output torque of the internal combustion engine.

SUMMARY

According to an aspect of the present disclosure, a first arithmetic unit is configured to compute a target control amount for an internal combustion engine according to a user required torque. A second arithmetic unit monitors presence or absence of a torque anomaly state in which an estimated torque is deviated from an engine required torque by a predetermined amount or more.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
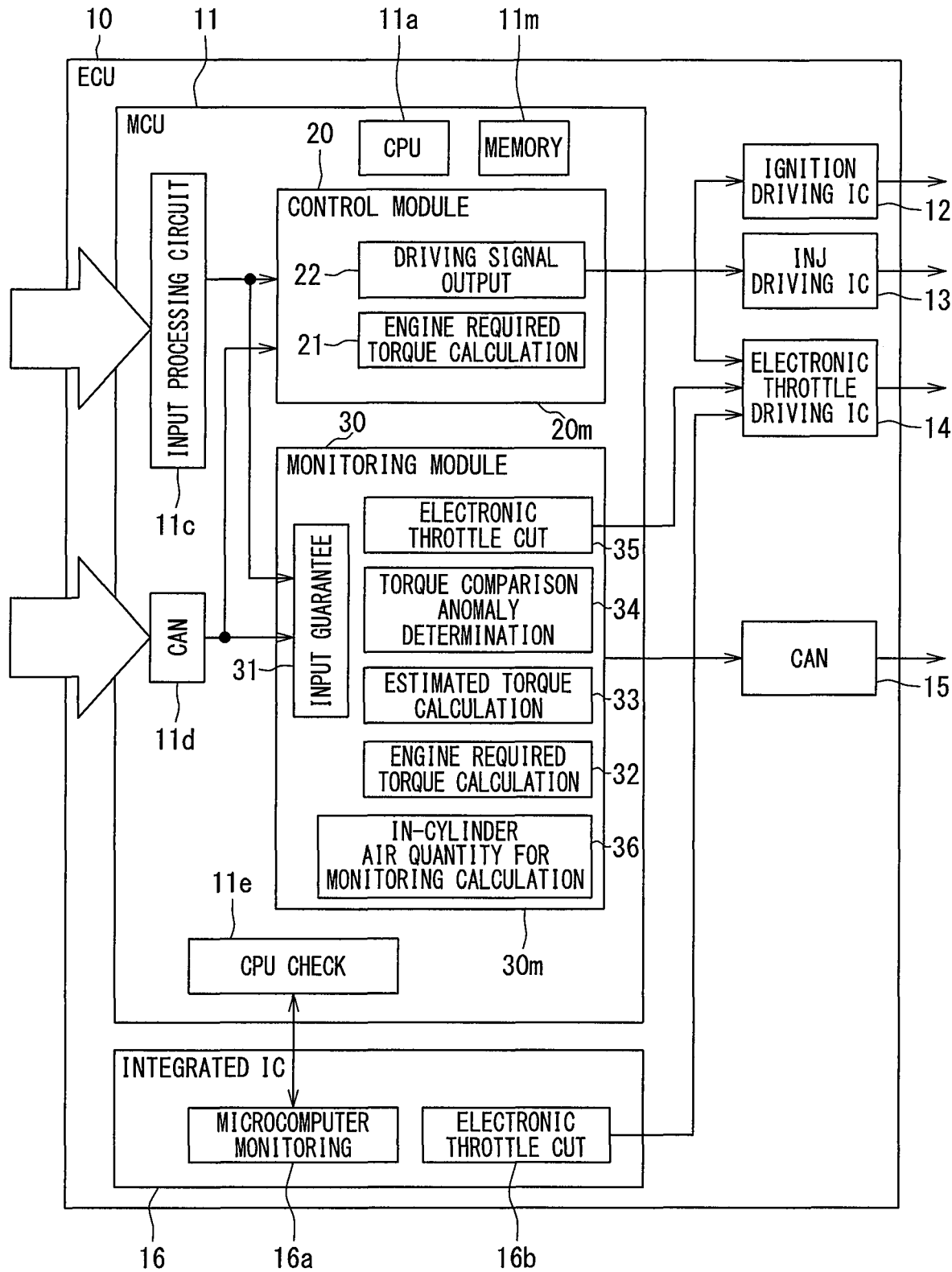
FIG. 1 is a block diagram of an internal combustion engine control system in a first embodiment.

To begin with, an example of the present disclosure will be described.

According to the example, an apparatus is provided to monitor presence or absence of various torque anomaly, such as a large deviation between a user required torque of an internal combustion engine that is required by a user and an actual torque of the internal combustion engine.

In an operation of an internal combustion engine, air generally passes through a throttle valve. For example, in order to implement scavenging, entirety of the air is not necessarily compressed in a compression stroke and is not used for combustion. A part of air that flows into a combustion chamber may be caused to flow out of an exhaust port. Scavenging refers to that both an intake valve and an exhaust valve are opened immediately after start of an intake stroke to let part of intake air blow through out of an exhaust port and sweep high-temperature gas or unburned gas remaining in the combustion chamber out of the exhaust port.

Therefore, even in a case where a quantity of air passing through a throttle valve is identical, an actual torque may differ depending on the presence or absence of blow through. Because of this fact, it is concerned that an actual torque estimation error may be increased in torque anomaly monitoring, and various torque anomaly may be not monitored with accuracy.

According to a first aspect of the present disclosure, an internal combustion engine control system comprises an control arithmetic unit configured, by using a control storage area, to perform computation to compute a target control amount that is a target value of control amount, by which a state of combustion of an internal combustion engine is controlled, according to a user required torque that is a driving torque of the internal combustion engine required by a user. The internal combustion engine control system further comprises a monitoring arithmetic unit configured, by using a monitoring storage area different from the control storage area, to perform computation and to monitor presence or absence of a torque anomaly state in which an estimated torque is deviated from an engine required torque by a predetermined amount or more. The estimated torque is an estimated value of actual torque of the internal combustion engine. The engine required torque is required of the internal combustion engine. The monitoring arithmetic unit is configured to compute the estimated torque by using a blow through state amount. The blow through state amount is a blow through quantity that is a quantity of intake air blowing through out of an exhaust port in an intake stroke of the internal combustion engine, a degree to which intake air blows through out of the exhaust port, or an in-cylinder air quantity that is a quantity of air filled into a combustion chamber of the internal combustion engine.

According to the internal combustion engine control system, a blow through state amount is used to compute an estimated torque used to monitor various torque anomaly. For this reason, an estimated torque computation error caused by the presence or absence of blow through as in scavenging or the like can be reduced and various torque anomaly can be monitored with accuracy.

A description will be given to a plurality of embodiments with reference to the drawings. In the description of the embodiments, functionally and/or structurally corresponding parts and/or associated parts may be affixed with an identical reference numeral or a reference numeral different in digit of hundred or higher. A description of other embodiments can be referred to for corresponding parts and/or associated parts.

First Embodiment

FIG. 1 illustrates ECU 10 that is an electronic control unit mounted in a vehicle and controls operation of an internal combustion engine mounted in the vehicle. The internal combustion engine in relation to the present embodiment is an ignition firing gasoline engine but may be a self ignition diesel engine. The internal combustion engine in the present embodiment includes: a supercharger that pressurizes and causes air to be sucked into a combustion chamber and a valve adjusting device that adjusts opening/closing timing of an intake/exhaust valve. The ECU 10 includes: MCU (Micro Controller Unit) 11, an ignition driving IC 12, a fuel injection valve driving IC 13, an electronic throttle driving IC 14, a communication circuit 15, and an integrated IC 16.

The MCU 11 includes a CPU 11$a$ as a processing unit, a memory 11$m$ as a storage medium, an input processing circuit 11$c$, a communication circuit 11$d$, and a CPU check circuit 11$e$. In the example shown in FIG. 1, the MCU 11 is constructed by integrating the CPU 11$a$, the memory 11$m$, the input processing circuit 11$c$, the communication circuit 11$d$, and the CPU check circuit 11$e$ over a single semiconductor chip but may be dispersedly integrated over a plurality of semiconductor chips. In case of dispersed integration over a plurality of semiconductor chips, the semiconductor chips may be mounted over a common substrate or a semiconductor chip may be mounted over each of a plurality of substrates. Each semiconductor chip may be accommodated in a single common enclosure or may be accommodated in separate enclosures.

The memory 11$m$ is a storage medium storing a program and data and includes a non-transitional, physical storage medium that non-temporarily stores a CPU 11$a$-readable program. The storage medium can be provided in a semiconductor memory, a magnetic disk, or the like. When executed by the CPU 11$a$, a program stored in the memory 11$m$ causes the ECU 10 to function as a device described in the present specification and causes a control device to function to perform a method described in the present specification.

A means and/or a function provided by a control device can be provided by software recorded on a physical storage medium and a computer executing the software, only software, only hardware, or a combination of these elements. For example, when a control device is provided in an electronic circuit as hardware, the control device can be provided in a digital circuit or an analog circuit including a large number of logic circuits.

The MCU 11 is inputted with various signals, including engine speed, accelerator position, intake manifold pressure, exhaust pressure, water temperature, oil temperature, and intake temperature and an external signal outputted from an external ECU. These signals are inputted from outside the ECU 10 to the input processing circuit 11$c$ or the communication circuit 11$d$.

A signal of engine speed is a signal indicating a detection value of a crank angle sensor and based on this detection value, the MCU 11 computes a number of revolutions per unit time of a crank shaft (output shaft) of an internal combustion engine, that is, a revolution speed of an output shaft. A signal of accelerator position is a signal indicating a detection value of an accelerator pedal sensor and based on this detection value, the MCU 11 computes a pedal depression amount of an accelerator pedal operated by a driver of a vehicle, that is, a user of the internal combustion engine.

A signal of intake manifold pressure is a signal indicating a detection value of an intake pressure sensor and based on this detection value, the MCU 11 computes a pressure of intake air sucked into a combustion chamber. A signal of exhaust pressure is a signal indicating a detection value of an exhaust pressure sensor and based on this detection value, the MCU 11 computes a pressure of exhaust air discharged from the combustion chamber. A signal of water temperature is a signal indicating a detection value of a water temperature sensor and based on this detection value, the MCU 11 computes a temperature of water cooling the internal combustion engine. A signal of oil temperature is a signal indicating a detection value of an oil temperature sensor and based on this detection value, the MCU 11 computes a temperature of lubricating oil of the internal combustion engine or a temperature of working fluid of a hydraulic actuator.

A signal of intake temperature is a signal indicating a detection value of an intake air temperature sensor and the MCU 11 computes a temperature of intake air sucked into a combustion chamber based on this detection value. One of concrete examples of external signals outputted from an external ECU is a signal representing an operating state of accessories that use an output shaft of an internal combustion engine as a driving source. One of concrete examples of the accessories is a refrigerant compressor provided in an air conditioner conditioning the air in a vehicle compartment, which is a compressor using an output shaft of an internal combustion engine as a driving source.

The ignition driving IC 12 includes a switching element that controls supply and interruption of power to an ignition device provided in an internal combustion engine and the MCU 11 outputs a command signal to this switching element. Specifically, based on the above-mentioned various signals of engine speed and the like, the MCU 11 computes a target ignition timing that is a target value of a timing with which spark ignition is caused by the ignition device and outputs a command signal to the ignition driving IC 12 according to the computed target ignition timing.

The fuel injection valve driving IC 13 includes a switching element that controls supply and interruption of power to a fuel injection valve provided in an internal combustion engine and the MCU 11 outputs a command signal to this switching element. Specifically, based on the above-mentioned various signals of engine speed and the like, the MCU 11 computes a target injection volume that is a target value of a duration during which fuel is injected by a fuel injection valve (that is, an injection volume) and outputs a command signal to the fuel injection valve driving IC 13 according to the computed target injection volume.

The electronic throttle driving IC 14 includes a switching element that controls supply and interruption of power to an electronic throttle valve (e-throt.) provided in an internal combustion engine and the MCU 11 outputs a command signal to this switching element. Specifically, based on the above-mentioned various signals of engine speed and the like, the MCU 11 computes a target opening that is a target value of a valve opening of an electronic throttle 94 (refer to FIG. 4) and outputs a command signal to the electronic throttle driving IC 14 according to the computed target opening.

Thus, a state of combustion in the internal combustion engine is controlled by the ECU 10 controlling operations of an ignition device, a fuel injection valve, and the electronic throttle 94. A target ignition timing, a target injection volume, and a target opening computed by the MCU 11 are equivalent to a target control amount that is a target value of a control amount by which a state of combustion in the internal combustion engine is controlled.

The communication circuit 15 outputs varied information grasped by the MCU 11 to an external ECU. For example, the communication circuit 15 outputs a signal of an anomaly flag indicating that some anomaly, such as a torque anomaly state, has occurred to a display ECU that controls operation of a display device viewed by a vehicle driver. When a signal of an anomaly flag is acquired, the display ECU gives a warning display or a warning sound.

The integrated IC 16 includes a memory, a CPU, which are not shown, and the like, the CPU executing various programs stored in the memory. According to a program executed by the CPU, the integrated IC 16 functions as a microcomputer monitoring portion 16a or functions as an electronic throttle cut control portion 16b.

The CPU check circuit 11e checks whether the CPU 11a and the memory 11m are normal, for example, by performing a check (for example, parity check) on whether a program and data stored in the memory 11m are normal. The microcomputer monitoring portion 16a refers to results of checks by the CPU check circuit 11e and monitors any operation failure of the MCU 11.

When the microcomputer monitoring portion 16a detects some anomaly, the integrated IC 16 exercises control on electronic throttle cut, for example, by limiting operation of the electronic throttle 94. For example, the integrated IC 16 fixes a target opening to a predetermined opening regardless of an accelerator position and limits an output of an internal combustion engine to less than a predetermined output. Or, the integrated IC 16 zeroes a target opening to forcedly stop the internal combustion engine. The electronic throttle cut control portion 16b outputs a signal commanding electronic throttle cut to the electronic throttle driving IC 14. The electronic throttle driving IC 14 operates with a higher priority given to an electronic throttle cut command signal than to a command signal outputted from the MCU 11.

The MCU 11 includes a control module 20 and a monitoring module 30. These modules are both a function provided by the common CPU 11a and memory 11m. That is, when the CPU 11a is executing a control program stored in a control storage area 20m in the memory 11m, the CPU 11a and the memory 11m function as the control module 20.

When the CPU 11a is executing a monitoring program stored in a monitoring storage area 30m in the memory 11m, the CPU 11a and the memory 11m function as the monitoring module 30. The control storage area 20m and the monitoring storage area 30m are separately established in different storage areas in the memory 11m.

The control module 20 provides a "control arithmetic unit" to compute the above-mentioned various target control amounts according to a user required torque that is a driving torque of an internal combustion engine required by a user. The monitoring module 30 provides a "monitoring arithmetic unit" to monitor whether a torque anomaly state is present and an estimated torque as an estimated value of an actual torque of the internal combustion engine is deviated by a predetermined amount or more from an engine required torque required of the internal combustion engine. The ECU 10 provides an internal combustion engine control system including the control arithmetic unit and the monitoring arithmetic unit.

The control module 20 has functions of an engine required torque calculation unit 21 and a driving signal output portion 22. The engine required torque calculation unit 21 calculates an engine required torque as a torque to be required of the internal combustion engine based on various signals acquired from the input processing circuit 11c and the communication circuit 11d. The driving signal output portion 22 computes the above-mentioned target control amounts of target ignition timing, target injection volume, target opening, and the like according to an engine required torque calculated at the engine required torque calculation unit 21. Further, the driving signal output portion 22 outputs various command signals to actuators, such as the ignition driving IC 12, the fuel injection valve driving IC 13, the electronic throttle driving IC 14, and the like according to the computed target control amounts.

A more detailed description will be given with reference to FIG. 2. The engine required torque calculation unit 21 has functions of a user required torque calculation unit 21a, a pumping loss calculation unit 21b, a friction loss calculation unit 21c, a torque efficiency calculation unit 21d, and computation units B1 to B6.

The user required torque calculation unit 21a (refer to FIG. 2) calculates a user required torque based on the above-mentioned engine speed and accelerator position. With a higher engine speed and with a larger accelerator position, a user required torque is calculated as a larger value. For example, a map indicating a correlation between engine speed and accelerator position and user required torque is stored in the memory 11m in advance and the user required torque calculation unit 21a refers to the map to calculate a user required torque corresponding to an engine speed and an accelerator position.

The pumping loss calculation unit 21b calculates a pumping loss torque that is a value obtained by converting a pumping loss into a torque based on the above-mentioned intake manifold pressure and exhaust pressure. Pumping loss means an energy loss caused by resistance received from air intake and exhaust when a piston of an internal combustion engine reciprocates. With a lower intake manifold pressure, an intake resistance in the intake stroke of a piston is considered to be large and a pumping loss is set to a higher value. With a higher exhaust pressure, an exhaust resistance in the exhaust stroke of a piston is considered to be large and a pumping loss is set to a higher value. For example, a map indicating a correlation between intake manifold pressure and exhaust pressure and pumping loss is stored in the memory 11m in advance and the pumping loss calculation unit 21b refers to the map to calculate a pumping loss corresponding to an intake manifold pressure and an exhaust pressure.

The friction loss calculation unit 21c calculates a friction loss torque that is a value obtained by converting a friction loss into a torque based on the above-mentioned water temperature and oil temperature. Friction loss means a mechanical energy loss caused by friction between a piston of an internal combustion engine and a cylinder when the piston reciprocates. As a water temperature gets out of a proper range and becomes lower or higher, friction is considered to be large and a friction loss is set to a higher value. With a lower oil temperature, the viscosity of a lubricating oil or the like is considered to be high and a friction loss is set to a higher value. For example, a map indicating a correlation between water temperature and oil temperature and friction loss is stored in the memory $11m$ in advance and the friction loss calculation unit $21c$ refers to the map to calculate a friction loss corresponding to a water temperature and an oil temperature.

The computation unit B1 adds a pumping loss calculated by the pumping loss calculation unit $21b$, a friction loss calculated by the friction loss calculation unit $21c$, and a loss torque learning value to compute a total loss torque. The computation unit B2 adds a user required torque calculated by the user required torque calculation unit 21, a total loss torque computed by the computation unit B1, and an external required torque to compute a loss inclusive torque. One of examples of external required torque is a torque equivalent to an increase in power generation by increasing a power generation amount by a generator driven by an internal combustion engine in order to charge an onboard battery.

The computation unit B3 adds a torque equivalent to each of idle reserve, catalyst warming-up reserve, and accessory reserve to compute a reserve torque. Each of these reserve torques is set by the control module 20 according to an operating state of an internal combustion engine including engine speed, engine load, water temperature, and the like. The computation unit B4 adds a reserve torque computed by the computation unit B3 to a loss inclusive torque computed by the computation unit B2 to compute a reserve inclusive torque.

Idle reserve torque means a torque equivalent to an increase in torque when during idling of an internal combustion engine, control is exercised to increase a torque to stabilize combustion. Catalyst warming-up reserve torque means a value obtained by converting a loss in combustion energy used to increase an exhaust temperature when warm-up control is exercised to increase the exhaust temperature to increase a temperature of a catalyst purifying exhaust from an internal combustion engine to an activation temperature or higher. Accessory reserve torque means a torque required to drive accessories, such as a generator, by using an internal combustion engine as a driving source.

The torque efficiency calculation unit $21d$ calculates a torque efficiency based on a best torque generation ignition timing (MBT ignition timing), a knock learning inclusive base lag amount, and a target lambda. MBT ignition timing means an ignition timing with which a best torque is obtained and varies according to engine speed, engine load, water temperature, and the like. However, with an MBT ignition timing, knocking is prone to occur; therefore, ignition is required to occur with a timing delayed by a predetermined time from the MBT ignition timing, that is, with a timing delayed by a predetermined angle from the MBT ignition timing. This delayed timing is referred to as a base ignition timing. This lag amount (base lag amount) varies according to engine speed, engine load, water temperature, and the like.

When knocking is detected by a sensor, feedback control is exercised to delay an ignition timing by a predetermined time to make a correction and learning control to reflect this lag correction amount (knock learning amount) in the subsequent ignition timing controls is referred to as knock learning. A timing obtained by reflecting a knock learning amount in a base ignition timing is equivalent to a target ignition timing.

The computation unit B5 computes a timing obtained by subtracting a target ignition timing from an MBT ignition timing as an MBT lag amount that is a lag amount of a target ignition timing relative to an MBT ignition timing. The torque efficiency calculation unit $21d$ calculates a torque efficiency based on an MBT lag amount computed by the computation unit B5 and a target lambda.

Torque efficiency means a ratio of energy converted into a rotating torque of a crank shaft to combustion energy in a combustion chamber. With a smaller MBT lag amount, that is, with a target ignition timing closer to an MBT ignition timing, a torque efficiency is calculated as a higher value. Target lambda means a target value of a ratio (lambda) of air and fuel contained in an air-fuel mixture burnt in a combustion chamber and the torque efficiency calculation unit $21d$ calculates a torque efficiency as a value corresponding to a target lambda. For example, a map indicating a correlation between MBT lag amount and target lambda and torque efficiency is stored in the memory $11m$ in advance and the torque efficiency calculation unit $21d$ refers to the map to calculate a torque efficiency corresponding to an MBT lag amount and a target lambda.

Each of the above-mentioned MBT ignition timing, base ignition timing, and target lambda is set by the control module 20 according to an operating state of an internal combustion engine including engine speed, engine load, water temperature, and the like.

Learning control related to the above-mentioned knock learning is exercised by the control module 20. The ECU 10 in the present embodiment includes a detection circuit detecting a driving current or voltage outputted from the ignition driving IC. The control module 20 uses a detection value from the detection circuit to compute an engine required torque. Specifically, the control module 20 calculates an actual ignition timing based on the above-mentioned detection value and uses the actual ignition timing to exercise learning control related to knock learning and calculate a knock learning amount.

The computation unit B6 divides a reserve inclusive torque computed by the computation unit B4 by a torque efficiency calculated by the torque efficiency calculation unit $21d$ to compute an engine required torque for control used for engine control. In short, the engine required torque calculation unit 21 divides a value obtained by adding a total loss torque and a reserve torque to a user required torque by a torque efficiency to calculate an engine required torque.

Figure 3:
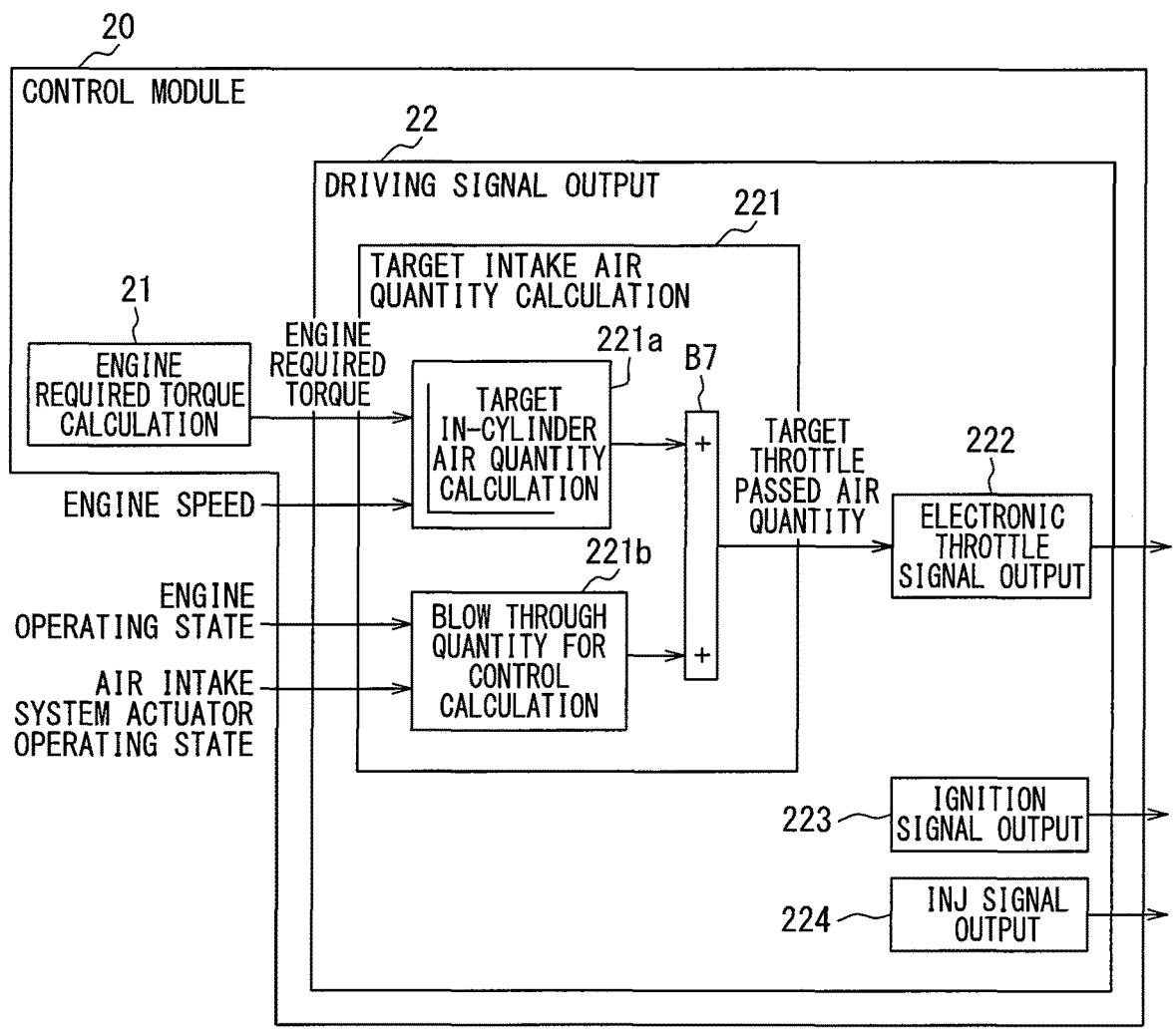
FIG. 3 is a block diagram of the control module shown in FIG. 1.

As illustrated in FIG. 3, the driving signal output portion 22 has functions of a target intake air quantity calculation unit 221, an electronic throttle signal output portion 222, an ignition signal output portion 223, and an INJ signal output portion 224. Further, the target intake air quantity calculation unit 221 includes a target in-cylinder air quantity calculation unit $221a$ and a blow through quantity for control calculation unit $221b$. Intake air quantity cited here refers to a quantity of air passed through a throttle valve (electronic throttle 94) installed in an intake pipe 95 (refer to FIG. 4) and hereafter, a definition of intake air quantity will be described in detail with reference to FIG. 4 and a description will be given to in-cylinder air quantity, blow through quantity, and scavenging.

Figure 4:
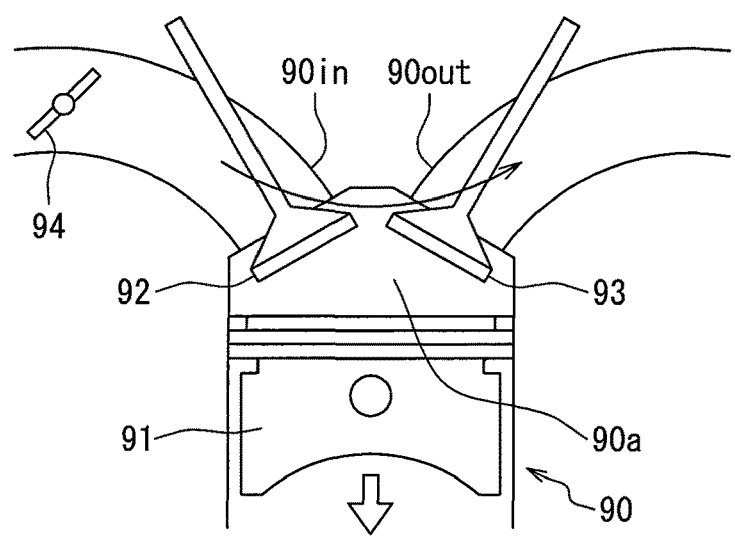
FIG. 4 is a schematic diagram of an internal combustion engine illustrating a situation in which scavenging is performed.

FIG. 4 illustrates a state observed immediately after an intake stroke of an internal combustion engine 90 starts and a piston 91 starts to descend from top dead center with both an intake valve 92 and an exhaust valve 93 opened. With the opening periods of both the valves overlapped with each other as mentioned above, as shown by an arrow in FIG. 4, part of air flowing from an intake port 90in into a combustion chamber 90a may blow through out of an exhaust port 90out depending on an engine speed or a degree of supercharging. Actively utilizing this blow through to sweep high-temperature gas or unburned gas remaining in the combustion chamber 90a out of the exhaust port 90out is referred to as scavenging. The ECU 10 sets an overlap period such that when an operating state of the internal combustion engine 90 meets a predetermined condition, scavenging is caused and controls an operation of the above-mentioned valve adjusting device so as to achieve this setting.

A quantity of air blowing through out of the exhaust port 90out in one combustion cycle as in the above-mentioned scavenging is referred to as blow through quantity and a quantity of air passed through the electronic throttle 94 is referred to as throttle passed air quantity or intake air quantity. Of a throttle passed air quantity, a quantity of air that does not blow through out of the exhaust port 90out and is filled in the combustion chamber 90a and compressed is referred to as in-cylinder air quantity. The blow through quantity and the in-cylinder air quantity are equivalent to "blow through state amount" representing a state of blow through.

With reference again to FIG. 3, a target intake air quantity calculation unit 221 calculates a target intake air quantity based on an engine required torque calculated by the engine required torque calculation unit 21, an engine speed, an engine operating state, and an air intake system actuator operating state. The electronic throttle signal output portion 222 outputs a command signal corresponding to a target intake air quantity calculated by the target intake air quantity calculation unit 221 to the electronic throttle driving IC 14. The ignition signal output portion 223 and the INJ signal output portion 224 output a command signal corresponding to an engine required torque calculated by the engine required torque calculation unit 21 to the ignition driving IC 12 and the fuel injection valve driving IC 13.

The target intake air quantity calculation unit 221 has functions of the target in-cylinder air quantity calculation unit 221a, the blow through quantity for control calculation unit 221b, and a computation unit B7.

The target in-cylinder air quantity calculation unit 221a calculates a target in-cylinder air quantity that is a target value of in-cylinder air quantity based on an engine speed and an engine required torque calculated by the engine required torque calculation unit 21. With a higher engine speed and with a larger engine required torque, a target in-cylinder air quantity is calculated as a larger value. For example, a map indicating a correlation between engine speed and engine required torque and target in-cylinder air quantity is stored in the memory 11m in advance and the user required torque calculation unit 21a refers to the map to calculate a target in-cylinder air quantity corresponding to an engine speed and an engine required torque.

The blow through quantity for control calculation unit 221b uses a model to calculate a blow through quantity based on an air intake system actuator operating state and an engine operating state. Concrete examples of air intake system actuators include a supercharger, a valve adjusting device, the electronic throttle 94, and the like. Concrete examples of engine operating states include engine speed, engine load, water temperature, and the like. The above model is a mathematical expression representing a correlation between the shape and size of the flow path of blow through shown in FIG. 4 and air intake system actuator operating state and engine operating state. By substituting physical quantities expressing these operating states into the above mathematical expression, the blow through quantity for control calculation unit 221b (control blow-through-state calculation unit) calculates a blow through quantity.

The computation unit B7 adds a blow through quantity calculated by the blow through quantity for control calculation unit 221b to a target in-cylinder air quantity calculated by the target in-cylinder air quantity calculation unit 221a to calculate a target intake air quantity. In short, the control module 20 corrects an in-cylinder air quantity corresponding to an engine required torque according to a blow through quantity to calculate a target intake air quantity and controls operation of the electronic throttle 94 based on this target intake air quantity.

As mentioned above, the monitoring module 30 monitors whether a torque anomaly state is present in which an estimated torque is deviated from an engine required torque by a predetermined amount or more and estimated torque means a value obtained by estimating an actual torque of an internal combustion engine. Engine required torque means a torque required of an internal combustion engine and is synonymous with an engine required torque calculated by the engine required torque calculation unit 21 of the control module 20. However, an engine required torque calculated at the monitoring module 30 is a value used to monitor various torque anomaly and an engine required torque calculated at the control module 20 is a value used to calculate a target control amount for an internal combustion engine. The engine required torque for monitoring and engine required torque for control are values computed in different storage areas in the memory 11m.

As illustrated in FIG. 1, the monitoring module 30 has functions of an input guarantee portion 31, an engine required torque computation unit 32, an estimated torque computation unit 33, a torque comparison anomaly determination portion 34, an electronic throttle cut control portion 35, and an in-cylinder air quantity for monitoring calculation unit 36.

The input guarantee portion 31 checks (for example, parity check) that data of various signals acquired from the input processing circuit 11c and the communication circuit 11d is normal. If any data is abnormal, the input guarantee portion 31 performs data restoration, data re-acquisition, data discard, or the like. As a result, the monitoring module 30 can be prevented from using abnormal data to perform various calculations. That is, the input guarantee portion 31 guarantees that varied data used for calculation by the monitoring module 30 is normal.

The torque comparison anomaly determination portion 34 calculates a difference between an engine required torque calculated by the engine required torque computation unit 32 and an estimated torque calculated by the estimated torque computation unit 33 and, when the difference is a predetermined value or higher, determines that the above-mentioned torque anomaly state is present. When the presence of a torque anomaly state is determined, the electronic throttle cut control portion 35 outputs a signal commanding electronic throttle cut to the electronic throttle driving IC 14 similarly to the electronic throttle cut control portion 16b.

Figure 5:
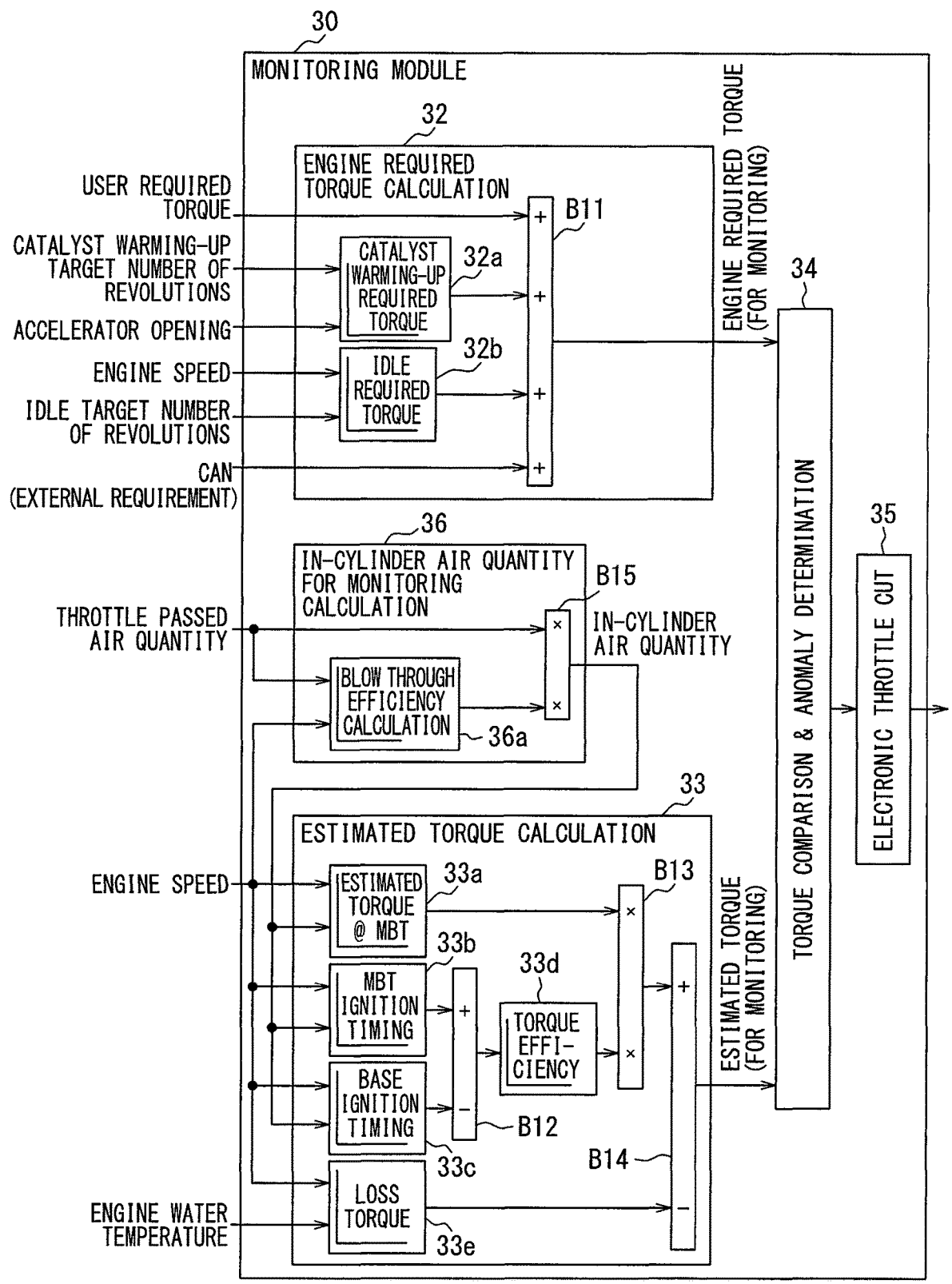
FIG. 5 is a block diagram of a monitoring module shown in FIG. 1.

As illustrated in FIG. 5, the engine required torque computation unit 32 has functions of a catalyst warming-up required torque calculation unit 32a, an idle required torque calculation unit 32b, and a computation unit B11.

The catalyst warming-up required torque calculation unit 32a calculates a catalyst warming-up required torque based on a catalyst warming-up target number of revolutions and the above-mentioned accelerator position. As mentioned above, in warming-up control, an exhaust temperature is increased to increase a temperature of a catalyst purifying an exhaust of an internal combustion engine to an activation temperature or higher and a target value of an engine speed during a period for which warming-up control is being exercised is a catalyst warming-up target number of revolutions. The catalyst warming-up required torque calculation unit 32*a* calculates a catalyst warming-up required torque based on an accelerator position and a catalyst warming-up target number of revolutions during a period for which warming-up control is being exercised.

Catalyst warming-up required torque is synonymous with catalyst warming-up reserve torque. However, a catalyst warming-up required torque calculated at the monitoring module 30 is a value used to monitor various torque anomaly and a catalyst warming-up reserve torque calculated at the control module 20 is a value used to calculate a target control amount for an internal combustion engine. That is, the catalyst warming-up required torque for monitoring and catalyst warming-up reserve torque for control are values computed in different storage areas in the memory 11*m*.

FIG. 5 shows catalyst warming-up target number of revolutions and accelerator position as examples of variables used to calculate a catalyst warming-up required torque but other variables include water temperature, user required torque, engine speed, and intake charging efficiency. Intake charging efficiency refers to a ratio of an in-cylinder air quantity to a throttle passed intake air quantity. The catalyst warming-up required torque calculation unit 32*a* uses at least one of these variables to calculate a catalyst warming-up required torque.

When an accelerator pedal is not depressed, a catalyst warming-up required torque (reserve amount) is calculated as a lager value with a larger catalyst warming-up target number of revolutions. When an accelerator pedal is depressed, a catalyst warming-up required torque is set to a predetermined value with an accelerator position being less than a predetermined value and is set to zero with an accelerator position being equal to a predetermined value or larger. A catalyst warming-up required torque may be increased or decreased according to a water temperature or an engine speed and a catalyst warming-up required torque may be increased or decreased according to a charging efficiency.

The idle required torque calculation unit 32*b* calculates an idle required torque based on an idle target number of revolutions and the above-mentioned engine speed. As mentioned above, in idle control, a torque is increased to stabilize combustion during idling of an internal combustion engine and a target value of an engine speed during a period for which this idle control is being exercised is an idle target number of revolutions. The idle required torque calculation unit 32*b* calculates an idle required torque based on an engine speed and an idle target number of revolutions during a period for which idle control is being exercised.

Idle required torque is synonymous with idle reserve torque. However, an idle required torque calculated at the monitoring module 30 is a value used to monitor various torque anomaly and an idle reserve torque calculated at the control module 20 is a value used to calculate a target control amount for an internal combustion engine. That is, the idle required torque for monitoring and idle reserve torque for control are values computed in different storage areas in the memory 11*m*.

FIG. 5 shows idle target number of revolutions and engine speed as examples of variables used to calculate an idle required torque but other variables include water temperature, vehicle speed, atmospheric pressure, and intake charging efficiency. The idle required torque calculation unit 32*b* uses at least one of these variables to calculate an idle required torque.

When an accelerator pedal is not depressed, with a smaller difference between a target number of revolutions and an engine speed, an idle required torque (reserve amount) is calculated as a larger value. When an accelerator pedal is depressed, with a smaller accelerator position, an idle required torque is calculated as a larger value. An idle required torque may be increased or decreased according to a water temperature or an engine speed and an idle required torque may be increased or decreased according to a charging efficiency.

The computation unit B11 adds a catalyst warming-up required torque and an idle required torque calculated at the catalyst warming-up required torque calculation unit 32*a* and the idle required torque calculation unit 32*b*, a user required torque, and an external required torque to calculate an engine required torque required of an internal combustion engine. A user required torque used in this calculation is calculated using data on engine speed and accelerator position guaranteed by the input guarantee portion 31.

According to the foregoing, the engine required torque computation unit 32 calculates an engine required torque required of an internal combustion engine based on various signals (data) acquired from the input processing circuit 11*c* and the communication circuit 11*d* and guaranteed by the input guarantee portion 31.

As illustrated in FIG. 5, the estimated torque computation unit 33 has functions of an estimated torque calculation unit 33*a*, an MBT ignition timing calculation unit 33*b*, a base ignition timing calculation unit 33*c*, a torque efficiency calculation unit 33*d*, a loss torque calculation unit 33*e*, and computation units B12, B13, and B14.

The estimated torque calculation unit 33*a* estimates an actual driving torque (MBT estimated torque) of an internal combustion engine obtained when an ignition timing is MBT based on an in-cylinder air quantity calculated by the in-cylinder air quantity for monitoring calculation unit 36 and an engine speed. With a higher engine speed and with a larger in-cylinder air quantity, an MBT estimated torque is calculated as a larger value. For example, a map indicating a correlation between engine speed and in-cylinder air quantity and MBT estimated torque is stored in the memory 11*m* in advance and the estimated torque calculation unit 33*a* refers to the map to calculate an MBT estimated torque corresponding to an engine speed and an in-cylinder air quantity.

The MBT ignition timing calculation unit 33*b* calculates an MBT ignition timing based on an in-cylinder air quantity and an engine speed. The base ignition timing calculation unit 33*c* calculates a base ignition timing based on an in-cylinder air quantity and an engine speed. The MBT ignition timing and the base ignition timing are calculated by referencing to a map stored in the memory 11*m* in advance as in the estimated torque calculation unit 33*a*.

The computation unit B12 computes a value obtained by subtracting a base ignition timing calculated by the base ignition timing calculation unit 33*c* from an MBT ignition timing calculated by the MBT ignition timing calculation unit 33*b* as the above-mentioned base lag amount. The torque efficiency calculation unit 33*d* calculates the above-mentioned torque efficiency based on a base lag amount computed by the computation unit B12. However, the torque efficiency calculation unit 33*d* considers a knock learning amount to be a predetermined amount or zero to calculate a torque efficiency.

The loss torque calculation unit 33e calculates a loss torque obtained by converting a loss energy including a pumping loss and a friction loss into a torque based on an engine speed and a water temperature. For example, a map indicating a correlation between engine speed and water temperature and loss torque is stored in the memory 11m in advance and the loss torque calculation unit 33e refers to the map to calculate a loss torque corresponding to an engine speed and a water temperature.

The computation unit B13 computes a value obtained by multiplying an MBT estimated torque calculated by the estimated torque calculation unit 33a by a torque efficiency calculated by the torque efficiency calculation unit 33d as an estimated torque without consideration of a loss torque. The computation unit B14 computes a value obtained by subtracting a loss torque calculated by the loss torque calculation unit 33e from an estimated torque computed by the computation unit B13 as an estimated torque for monitoring.

According to the foregoing, the estimated torque computation unit 33 estimates a driving torque actually outputted by an internal combustion engine based on various signals (data) acquired from the input processing circuit 11c and the communication circuit 11d and guaranteed by the input guarantee portion 31.

The in-cylinder air quantity for monitoring calculation unit 36 has functions as a blow through efficiency calculation unit 36a and a computation unit B15. The blow through efficiency calculation unit 36a calculates a blow through efficiency based on a throttle passed air quantity (intake air quantity) and an engine speed. Blow through efficiency refers to a ratio of an in-cylinder air quantity to an intake air quantity and with a smaller value of blow through efficiency, an in-cylinder air quantity becomes smaller. With a higher engine speed and with a larger intake air quantity, a blow through quantity is considered to become larger and an in-cylinder air quantity is considered to become smaller; and a blow through efficiency is calculated as a smaller value. For example, a map indicating a correlation between engine speed and intake air quantity and blow through efficiency is stored in the memory 11m in advance and the blow through efficiency calculation unit 36a refers to the map to calculate a blow through efficiency corresponding to an engine speed and an intake air quantity. An intake air quantity used in this calculation is calculated by the monitoring module 30 based on data guaranteed by the input guarantee portion 31. Or, when an intake air quantity is detected by an air flow meter detecting intake air quantities and a resulting detection value is guaranteed by the input guarantee portion 31, this guaranteed detection value of intake air quantity may be used to calculate a blow through efficiency.

The computation unit B15 calculates a value obtained by multiplying an intake air quantity by a blow through efficiency calculated by the blow through efficiency calculation unit 36a as an in-cylinder air quantity. An intake air quantity used in this calculation is a value calculated at the monitoring module 30 and is different from a target in-cylinder air quantity calculated at the control module 20. The in-cylinder air quantity for monitoring calculation unit 36 in the present embodiment is equivalent to a monitoring blow-through-state calculation unit that calculates an in-cylinder air quantity (blow through state amount) used to compute an estimated torque.

Figure 6:
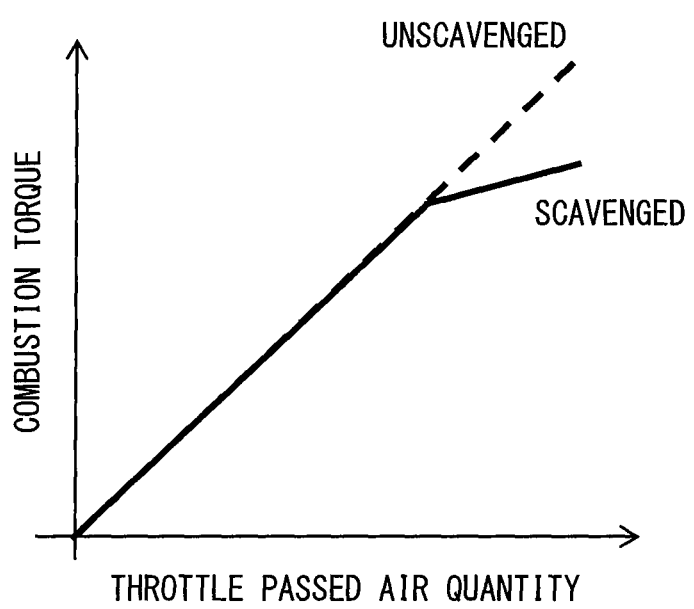
FIG. 6 is a drawing illustrating how a value of combustion torque relative to a throttle passed air quantity is influenced by scavenging.

In FIG. 6, the horizontal axis indicates throttle passed air quantity (intake air quantity) and the vertical axis indicates combustion torque. In case of the ignition firing internal combustion engine 90, unlike a self firing type, a ratio (air-fuel ratio) of air and fuel contained in an air-fuel mixture supplied to combustion is required to be a desired ratio. For this reason, as indicated in FIG. 6, with a larger intake air quantity, a quantity of an air-fuel mixture adjusted to a desired air-fuel ratio is more increased and a combustion torque becomes larger. However, when scavenging is performed, an in-cylinder air quantity is reduced by an amount equivalent to a blow through quantity and consequently, a quantity of the air-fuel mixture is reduced. Therefore, a magnitude of combustion torquer relative to a throttle passed air quantity (intake air quantity) is smaller when scavenging is performed than when scavenging is not performed. In the example shown in FIG. 6, in conjunction of execution of scavenging, in a high-load running range in which an intake air quantity is equal to or larger than a predetermined value, an air-fuel mixture is reduced in quantity by an amount equivalent to a blow through quantity and a combustion torque is lowered.

During operation of an internal combustion engine, a monitoring function provided by the monitoring module 30 is constantly actuated. Specifically, main processing illustrated in FIG. 7 is constantly performed.

Figure 7:
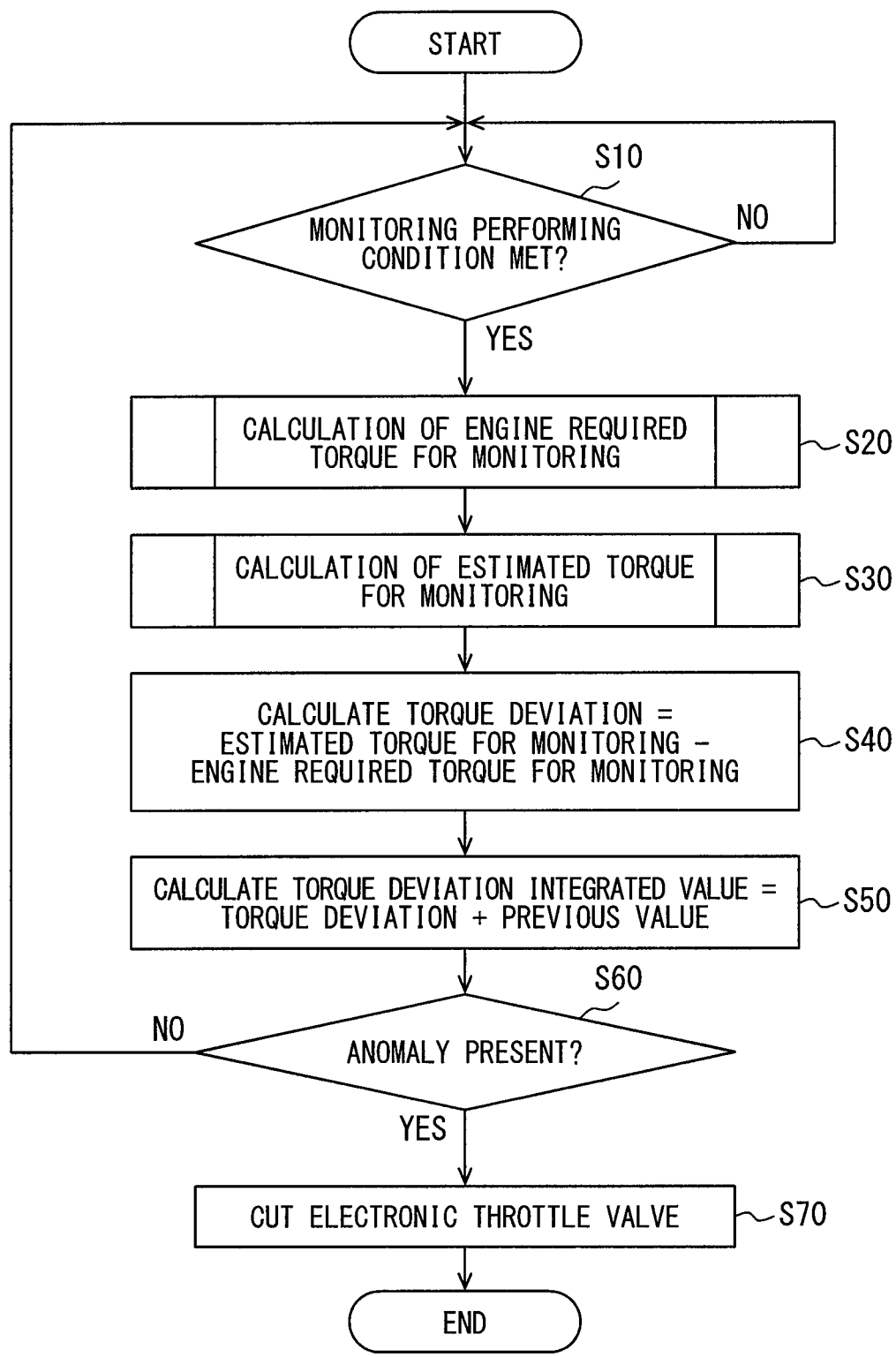
FIG. 7 is a flowchart illustrating a procedure for torque monitoring control in the first embodiment.

In the main processing illustrated in FIG. 7, at S10, first, whether a monitoring performing condition is met is determined. Concrete examples of monitoring performing conditions include that a check by the CPU check circuit 11e should have been completed, that the microcomputer monitoring portion 16a should not have detected any anomaly, and the like.

Figure 8:
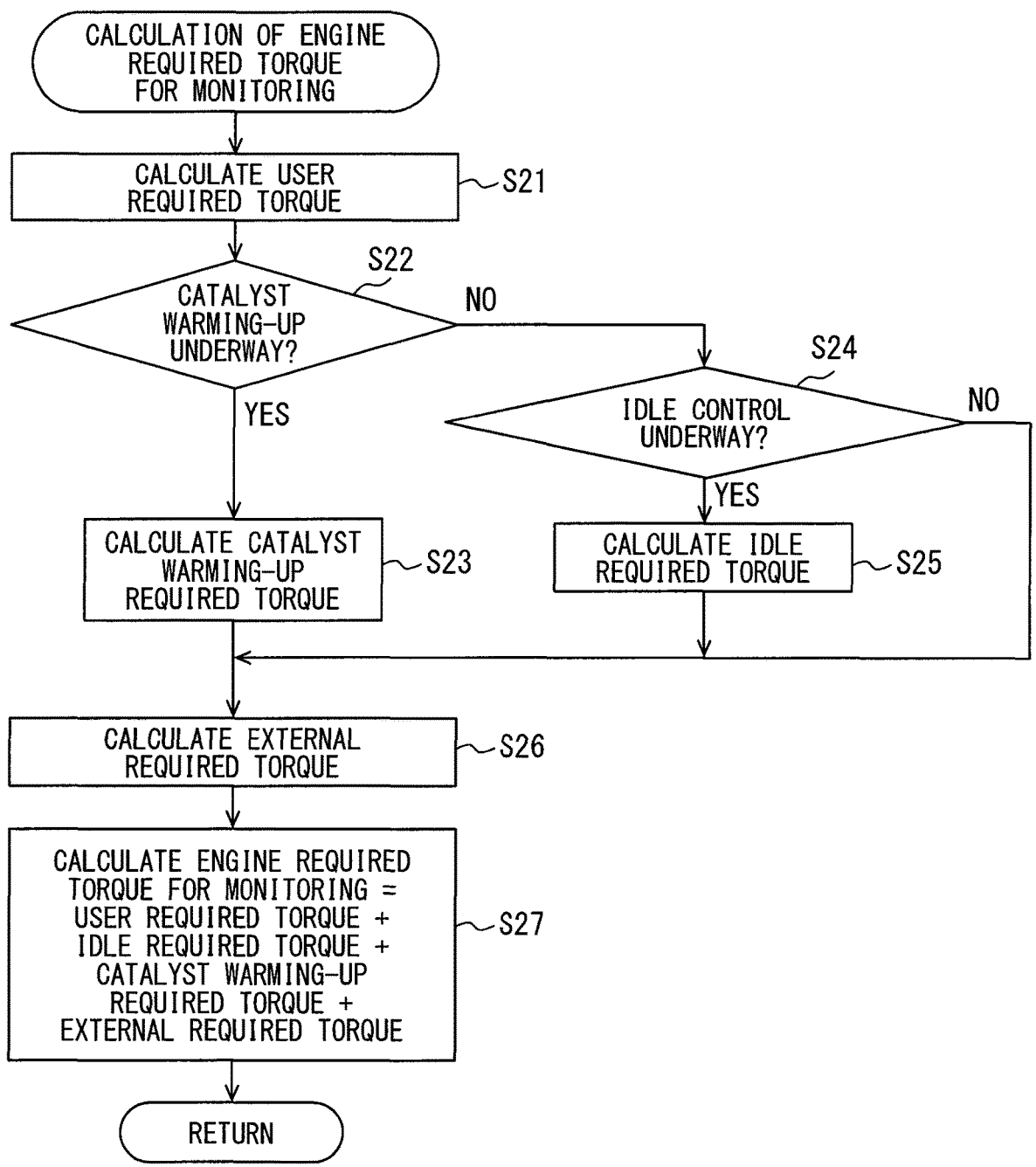
FIG. 8 is a flowchart illustrating a procedure for the required torque for monitoring calculation processing shown in FIG. 7.

When a determination that a monitoring performing condition is met is made, at S20, the engine required torque computation unit 32 calculates an engine required torque for monitoring according to subroutine processing shown in FIG. 8. At S30, the estimated torque computation unit 33 calculates an estimated torque for monitoring according to subroutine processing shown in FIG. 9.

At S40, S50, and S60, an anomaly determination is made by the torque comparison anomaly determination portion 34. Specifically, at S40, first, an engine required torque calculated at S20 is subtracted from an estimated torque calculated at S30 to calculate a torque deviation. At S50, subsequently, the torque deviation calculated at S40 is integrated with a previous value to calculate an integrated value. At S60, subsequently, when the integrated value calculated at S50 is a predetermined value or higher, presence of a torque anomaly is determined. The integrated value is reset, for example, by stopping an internal combustion engine. When presence of a torque anomaly is determined at S60, at S70, the electronic throttle cut control portion 35 outputs an electronic throttle cut command signal.

In the subroutine processing shown in FIG. 8, at S21, first, a user required torque is calculated. Though in the engine required torque computation unit 32 shown in FIG. 5, a block of user required torque calculation is omitted, a user required torque is calculated based on an engine speed and an accelerator position, for example, as by the user required torque calculation unit 21a. However, data on engine speed and accelerator position guaranteed by the input guarantee portion 31 is used to calculate a user required torque.

At S22, whether warming-up control is being exercised to increase a temperature of a catalysis to an activation temperature or higher is determined. Whether warming-up control is being exercised is determined, for example, based on an engine speed, an accelerator position, a water temperature, and the like. When warming-up control being underway is determined, at S23, the catalyst warming-up required torque calculation unit 32a calculates a catalyst warming-up required torque based on at least one of a catalyst warming-up target number of revolutions, an accelerator position, a water temperature, a user required torque, an engine speed, and an intake charging efficiency.

When warming-up control being underway is not determined, at S24, whether idle control is being exercised to increase a torque to stabilize combustion during idling is determined. Whether idle control is being exercised is determined, for example, based on an engine speed and an accelerator position. When idle control being underway is determined, at S25, the idle required torque calculation unit 32b calculates an idle required torque based on at least one of an idle target number of revolutions, an engine speed, a water temperature, a vehicle speed, an atmospheric pressure, and an intake charging efficiency.

At S26, an external required torque that is a driving torque caused by an external requirement, such as increase in power generation amount, is calculated. At S27, subsequently, the user required torque acquired at S21, the idle required torque acquired at S25, the catalyst warming-up required torque acquired at S23, and the external required torque acquired at S26 are added. A value obtained by this addition is calculated as an engine required torque for monitoring.

When the processing of S25 is not performed, for example, when warming-up control being underway is determined at S22, an idle required torque, if any, calculated immediately before is used in the calculation at S27. When the processing of S23 is not performed, a catalyst warming-up required torque, if any, calculated immediately before is used in the calculation at S27.

Figure 9:
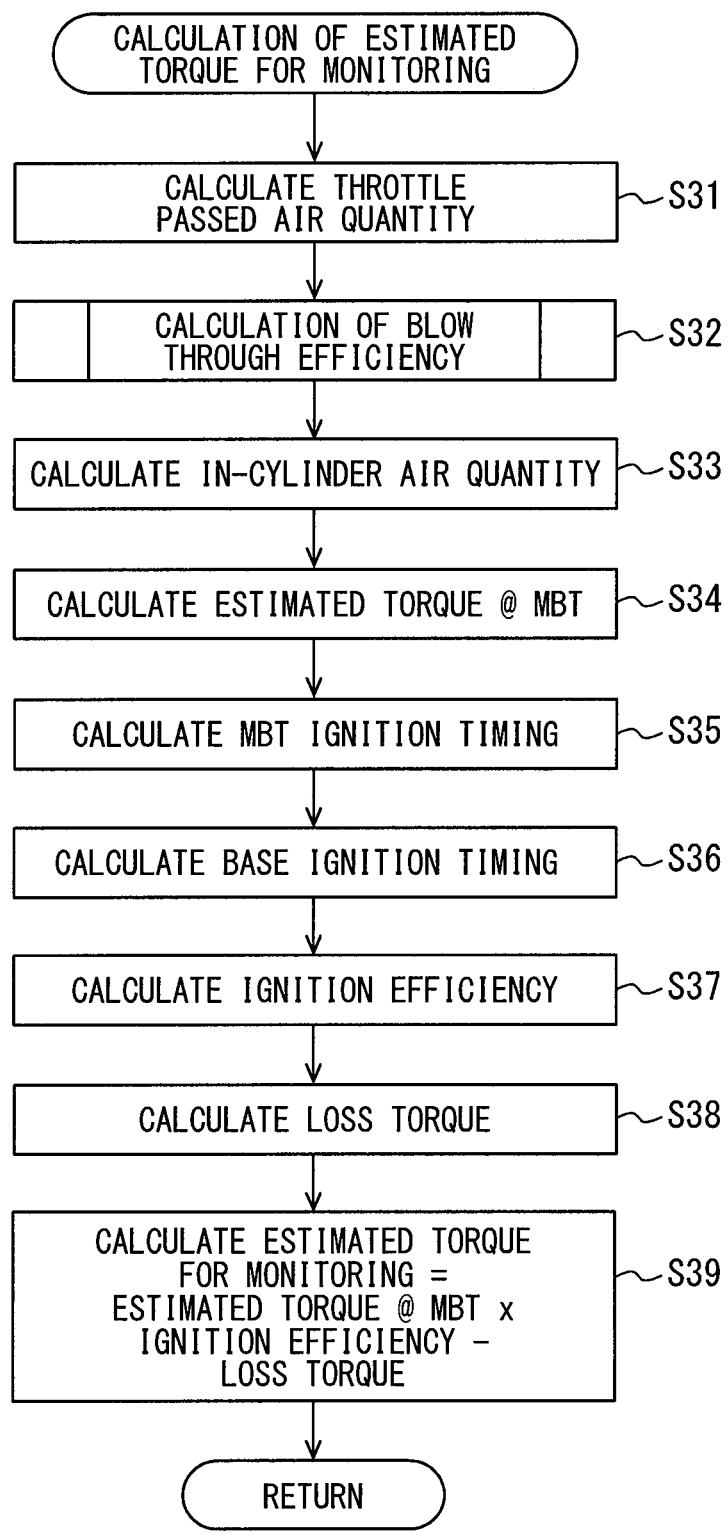
FIG. 9 is a flowchart illustrating a procedure for the estimated torque for monitoring calculation processing shown in FIG. 7.

In the subroutine processing shown in FIG. 9, at S31, first, a throttle passed air quantity (intake air quantity) is calculated. An intake air quantity used in this calculation is calculated by the monitoring module 30 using data on engine speed, accelerator position, and the like guaranteed by the input guarantee portion 31. A target value of intake air quantity is calculated also at the target intake air quantity calculation unit 221 of the control module 20 and an intake air quantity is calculated also by the monitoring module 30 aside from this calculation by the control module 20. While a model is used to calculate an intake air quantity at the control module 20 as mentioned above, a model is not used to calculate an intake air quantity at the monitoring module 30.

In the control module 20, specifically, a model obtained by converting the shape and size of the blow through passage shown in FIG. 4 into numerical values is stored in the control storage area 20m. The blow through passage is a passage of an air intake/exhaust system including at least the intake port 90in, the combustion chamber 90a, and the exhaust port 90out. The control module 20 substitutes various parameters representing an air intake system actuator operating state and an engine operating state into the above model to calculate an intake air quantity as well as blow through state amounts such as a blow through quantity.

Meanwhile, at the monitoring module 30, an in-cylinder air quantity is calculated based on a throttle passed air quantity and an engine speed. A throttle passed air quantity used in this calculation is calculated by the monitoring module 30 based on data guaranteed by the input guarantee portion 31. For example, a throttle passed air quantity is calculated based on an intake manifold pressure detected by an intake pressure sensor, an accelerator position detected by an accelerator pedal sensor, and an intake temperature detected by an intake air temperature sensor. Specifically, with a higher intake manifold pressure, with a larger accelerator position, and with a lower intake temperature, a throttle passed air quantity is calculated as a larger value.

Figure 10:
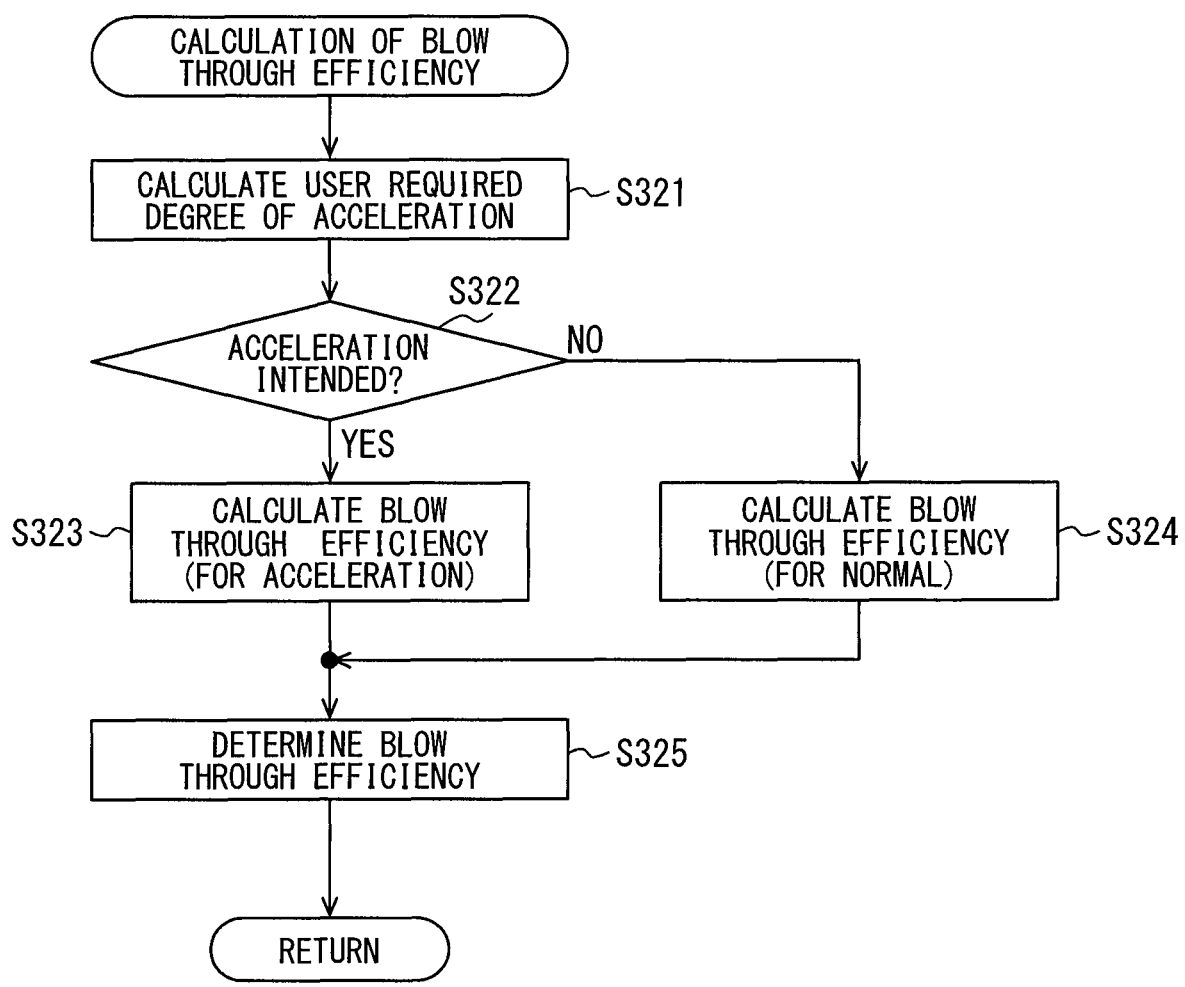
FIG. 10 is a flowchart illustrating a procedure for blow through efficiency calculation processing in the first embodiment.

At S32, according to the subroutine processing shown in FIG. 10, the blow through efficiency calculation unit 36a calculates a blow through efficiency. At S33, the computation unit B15 calculates an in-cylinder air quantity based on the blow through efficiency calculated at S32 and the throttle passed air quantity.

At S34, the estimated torque calculation unit 33a calculates an MBT estimated torque based on an engine speed and a charging efficiency. At S35, the MBT ignition timing calculation unit 33b calculates an MBT ignition timing based on a charging efficiency and an engine speed. At S36, the base ignition timing calculation unit 33c estimates a base ignition timing based on a charging efficiency and an engine speed.

At S37, the torque efficiency calculation unit 33d calculates an ignition efficiency based on a value (base lag amount) obtained by subtracting the base ignition timing calculated at S36 from the MBT ignition timing calculated at S35. At S38, the loss torque calculation unit 33e calculates a loss torque based on an engine speed and a water temperature.

At S39, an estimated torque for monitoring is calculated by multiplying the MBT estimated torque acquired at S34 by the ignition efficiency acquired at S37 and subtracting the loss torque acquired at S38 from a value obtained by this multiplication.

In the subroutine processing shown in FIG. 10, at S321, first, a required degree of acceleration that is a degree of acceleration of a vehicle required by a vehicle user. For example, this required degree of acceleration is defined by a ratio of a user required torque to an engine required torque. At S322, whether the user has intention to accelerate the vehicle is determined. Specifically, when the required degree of acceleration calculated at S321 is at a predetermined value or above, the presence of intention of acceleration is determined.

As mentioned above, the blow through efficiency calculation unit 36a uses a map to calculate a blow through efficiency. As this map, two different types of maps, an acceleration map and a normal map, are stored in the memory 11m and these maps are selectively used depending on the presence or absence of intention of acceleration. Specifically, when the presence of intention of acceleration is determined, at S323, a blow through efficiency is calculated based on an intake air quantity and an engine speed using the acceleration map. When the absence of intention of acceleration is determined, a blow through efficiency is calculated based on an intake air quantity and an engine speed using the normal map. The acceleration map and the normal map are different from each other in correlation between engine speed and intake air quantity and blow through efficiency. Since at the time of acceleration, a response lag in operation of a valve adjusting device or a response lag in intake pressure is present, the above-mentioned correlation is made different with these response lags taken into account.

At S325, a blow through efficiency is determined by referring both to a blow through efficiency calculated using the normal map and to a blow through efficiency calculated using the acceleration map. In other words, a value of blow through efficiency used in the calculation at S33 in FIG. 9 is determined based on a history of the calculated blow through efficiency. For example, immediately after a transition from the absence of intention of acceleration to the presence, an average value of a blow through efficiency calculated using the normal map in the previous calculation and a blow through efficiency calculated using the acceleration map in the present calculation is taken as a determined value of blow through efficiency.

Figure 11:
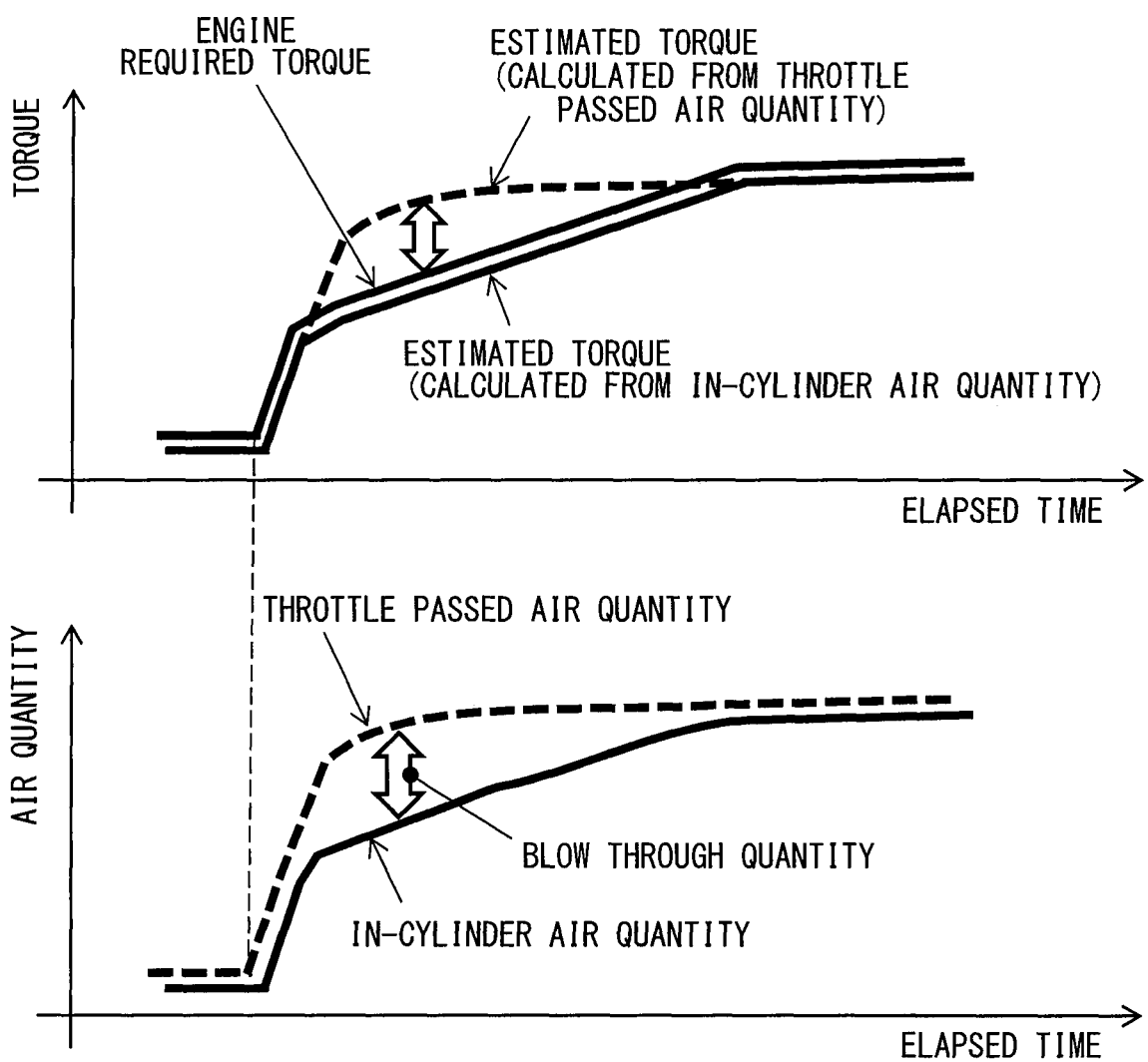
FIG. 11 is time charts illustrating an aspect in which time changes of a torque and an air quantity are shown and a torque anomaly is erroneously determined.

The lower part of FIG. 11 indicates a state in which a throttle passed air quantity and an in-cylinder air quantity are deviated from each other by an amount equivalent to a blow through quantity due to scavenging. When in this state, an estimated torque is calculated based on an in-cylinder air quantity as shown in the lower part of FIG. 11, a blow through quantity is excluded from an air quantity contributing to combustion; therefore, a deviation between an engine required torque and an estimated torque is small (refer to the solid line). Meanwhile, when an estimated torque is calculated based on a throttle passed air quantity, a torque is estimated with an air quantity including a blow through quantity being considered as an air quantity contributing to combustion; therefore, a deviation between an engine required torque and an estimated torque is large (refer to the broken line).

An internal combustion engine control system according to the present embodiment includes the control module 20 (control arithmetic unit) and the monitoring module 30 (monitoring arithmetic unit). The control module 20 is an arithmetic unit that uses the control storage area 20*m* to perform computation and computes a target control amount according to a user required torque. The monitoring module 30 is an arithmetic unit that uses the monitoring storage area 30*m*, different from the control storage area 20*m*, to perform computation and monitors the presence or absence of a torque anomaly state in which an estimated torque is deviated from an engine required torque by a predetermined amount or more. The monitoring module 30 uses an in-cylinder air quantity (blow through state amount) to compute an estimated torque. For this reason, an estimated torque computation error caused by whether scavenging is performed or not can be reduced and various torque anomaly can be monitored with accuracy.

In case of blow through state amount used to control an internal combustion engine, a high operation accuracy and a short operation cycle are required; in case of blow through state amount used to monitor various torque anomaly, the above-mentioned requirements are mitigated as compared with the case of internal combustion engine control. However, in case of blow through state amount used for monitoring, a higher level of guarantee is required for the normality of data used to compute a blow through state amount as compared with cases where the data is used for control.

In consideration of this respect, in the present embodiment, the control module 20 includes the blow through quantity for control calculation unit 221*b* (control blow-through-state calculation unit) that calculates a blow through quantity (blow through state amount) used to compute a target control amount. The monitoring module 30 includes the in-cylinder air quantity for monitoring calculation unit 36 that calculates an in-cylinder air quantity (blow through state amount) used to compute an estimated torque. That is, the monitoring module 30 calculates a blow through state amount aside from a blow through state amount calculated by the control module 20. For this reason, with respect to each of a blow through state amount used for monitoring and a blow through state amount used for control, the above-mentioned different requirements can be easily coped with. For example, with respect to data used in computation performed by the control module 20, the above-mentioned requirements can be coped with by making normality guarantee lower than data used in computation performed by the monitoring module 30 and enhancing a computing speed.

In the present embodiment, further, the monitoring module 30 calculates a blow through state amount based on at least one of throttle passed air quantity, overlap period, intake pressure, exhaust pressure, and engine speed. These items, throttle passed air quantity, overlap period, intake pressure, exhaust pressure, and engine speed are closely correlated with blow through state amount; therefore, according to the present embodiment, a blow through state amount can be calculated with accuracy. With a larger throttle passed air quantity, with a longer overlap period, and with a higher engine speed, a blow through quantity (blow through state amount) becomes larger. With a larger throttle passed air quantity, with a higher engine speed, and with a higher intake pressure, an in-cylinder air quantity (blow through state amount) becomes larger.

As mentioned above, a computing speed and an operation accuracy required of blow through state amount used for monitoring are lower than required of blow through state amount used for control. In consideration of this respect, in the present embodiment, an operation cycle of the monitoring module 30 is longer than an operation cycle of the control module 20. For this reason, unnecessary increase in arithmetic processing load on the monitoring module 30 can be avoided.

As mentioned above, in case of blow through state amount used for monitoring, a higher level of guarantee is required for the normality of data used to compute a blow through state amount as compared with cases where the data is used for control. In consideration of this respect, in the present embodiment, the monitoring module 30 includes the input guarantee portion 31 that checks data acquired from outside the monitoring module 30 for normality. For this reason, the level of guarantee of the normality of data used in computation by the monitoring module 30 can be enhanced and the above-mentioned requirement can be coped with.

In the present embodiment, further, the monitoring module 30 includes the engine required torque computation unit 32 and the estimated torque computation unit 33. The engine required torque computation unit 32 calculates a reduction in actual torque caused in conjunction with a lag in ignition timing of an internal combustion engine as a reserve torque and computes an engine required torque based on the calculated reserve torque and a user required torque. For this reason, a deviation between an engine required torque and an estimated torque caused by computation of an engine required torque without consideration of a reserve torque can be suppressed and thus a possibility of erroneous determination of a torque anomaly can be suppressed.

In the present embodiment, further, the control module 20 makes setting such that a target ignition timing is delayed when catalyst warming-up is required and the engine required torque computation unit 32 calculates a reserve torque such that the reserve torque is not less than a torque equivalent to degradation in combustion efficiency corresponding to a lag amount for the catalyst warming-up requirement.

In the present embodiment, furthermore, the control module 20 makes setting such that a target ignition timing is delayed during idling and the engine required torque computation unit 32 calculates a reserve torque such that the reserve torque is not less than a torque equivalent to degradation in combustion efficiency corresponding to a lag amount for the idle required torque. Since a degradation in combustion efficiency caused by an ignition timing lag like a catalyst warming-up requirement or an idle requirement is reflected in an engine required torque for monitoring, the above-mentioned possibility of erroneous determination can be suppressed.

Second Embodiment

Figure 12:
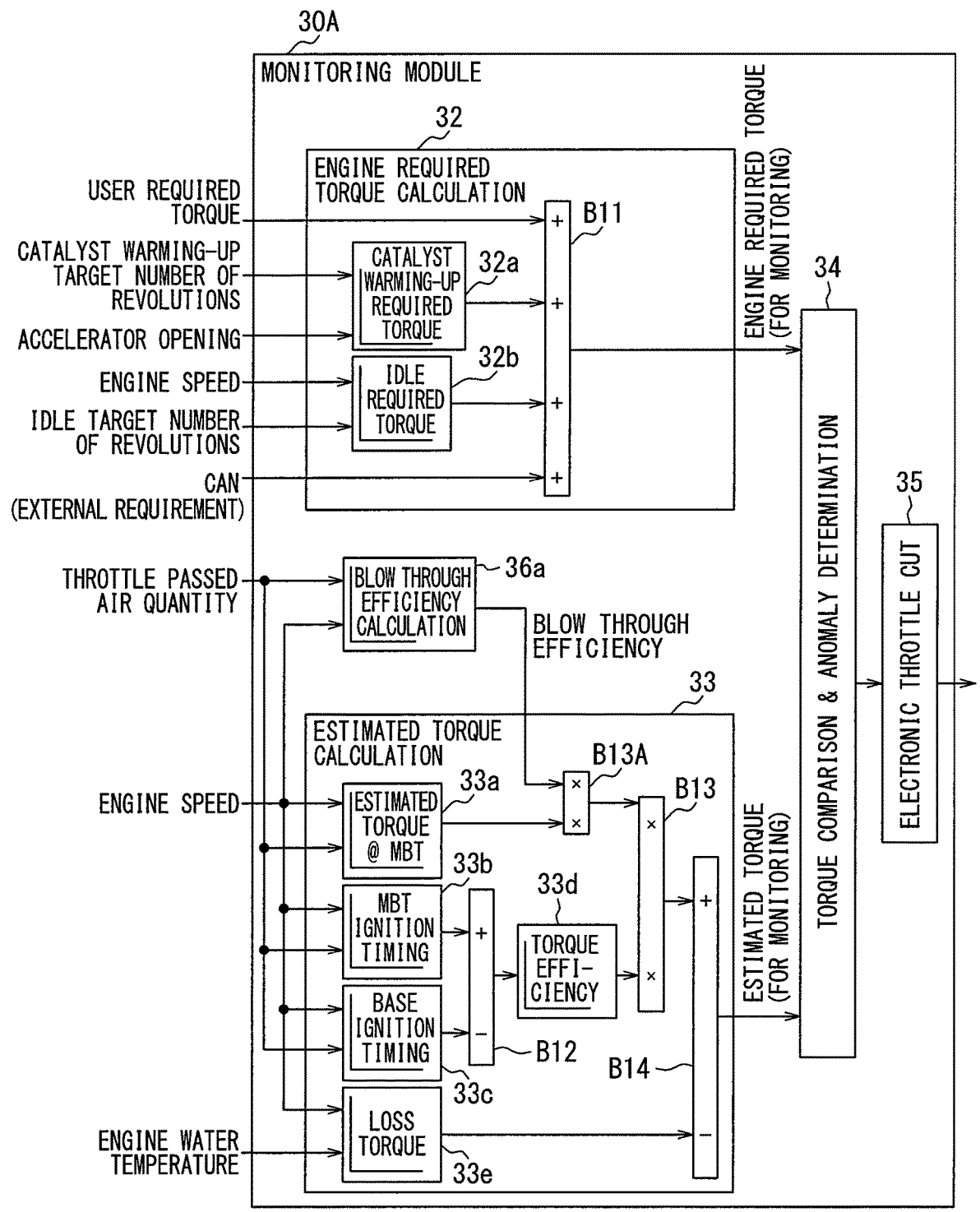
FIG. 12 is a block diagram of a monitoring module in a second embodiment.

An internal combustion engine control system in the present embodiment is obtained by modifying the in-cylinder air quantity for monitoring calculation unit 36 in the first embodiment as shown in FIG. 12 and any configuration element not especially covered here is identical with a corresponding configuration element in the first embodiment.

In the monitoring module 30 in the first embodiment, the estimated torque calculation unit 33a, the MBT ignition timing calculation unit 33b, and the base ignition timing calculation unit 33c use an engine speed and an in-cylinder air quantity to perform various calculations. For the in-cylinder air quantity used in these calculations, an in-cylinder air quantity calculated by the in-cylinder air quantity for monitoring calculation unit 36 is used.

Meanwhile, in a monitoring module 30A in the present embodiment, the estimated torque calculation unit 33a, the MBT ignition timing calculation unit 33b, and the base ignition timing calculation unit 33c use an engine speed and a throttle passed air quantity to perform various calculations. A computation unit B13A multiplies a driving torque calculated at the estimated torque calculation unit 33a without consideration of scavenging by a blow through efficiency calculated at the blow through efficiency calculation unit 36a.

A value obtained by this multiplication can be said to be a value obtained by correcting the above driving torque into a driving torque with consideration of scavenging. Specifically, with a higher blow through efficiency, a driving torque is corrected into a lager value and with a lower blow through efficiency, a driving torque is corrected into a smaller value. The blow through efficiency calculation unit 36a in the present embodiment is equivalent to a monitoring blow-through-state calculation unit that calculates a blow through efficiency (blow through state amount) used to compute an estimated torque.

In short, while in the monitoring module 30 in the first embodiment, in-cylinder air quantity is taken as a blow through state amount used to compute an estimated torque, in the monitoring module 30A in the present embodiment, blow through efficiency is taken as a blow through state amount used to compute an estimated torque. As mentioned above, the blow through efficiency is a ratio of an in-cylinder air quantity to a throttle passed air quantity (intake air quantity).

According to the present embodiment, as mentioned above, a driving torque with consideration of scavenging is used to calculate an estimated torque for monitoring; therefore, an estimated torque computation error caused by whether scavenging is performed or not can be reduced and various torque anomaly can be monitored with accuracy.

Third Embodiment

In the first embodiment, when the monitoring module 30 computes an estimated torque, the module (monitoring module 30) itself calculates a blow through state amount for use in this computation. Specifically, the monitoring module 30 includes the in-cylinder air quantity for monitoring calculation unit 36.

Figure 13:
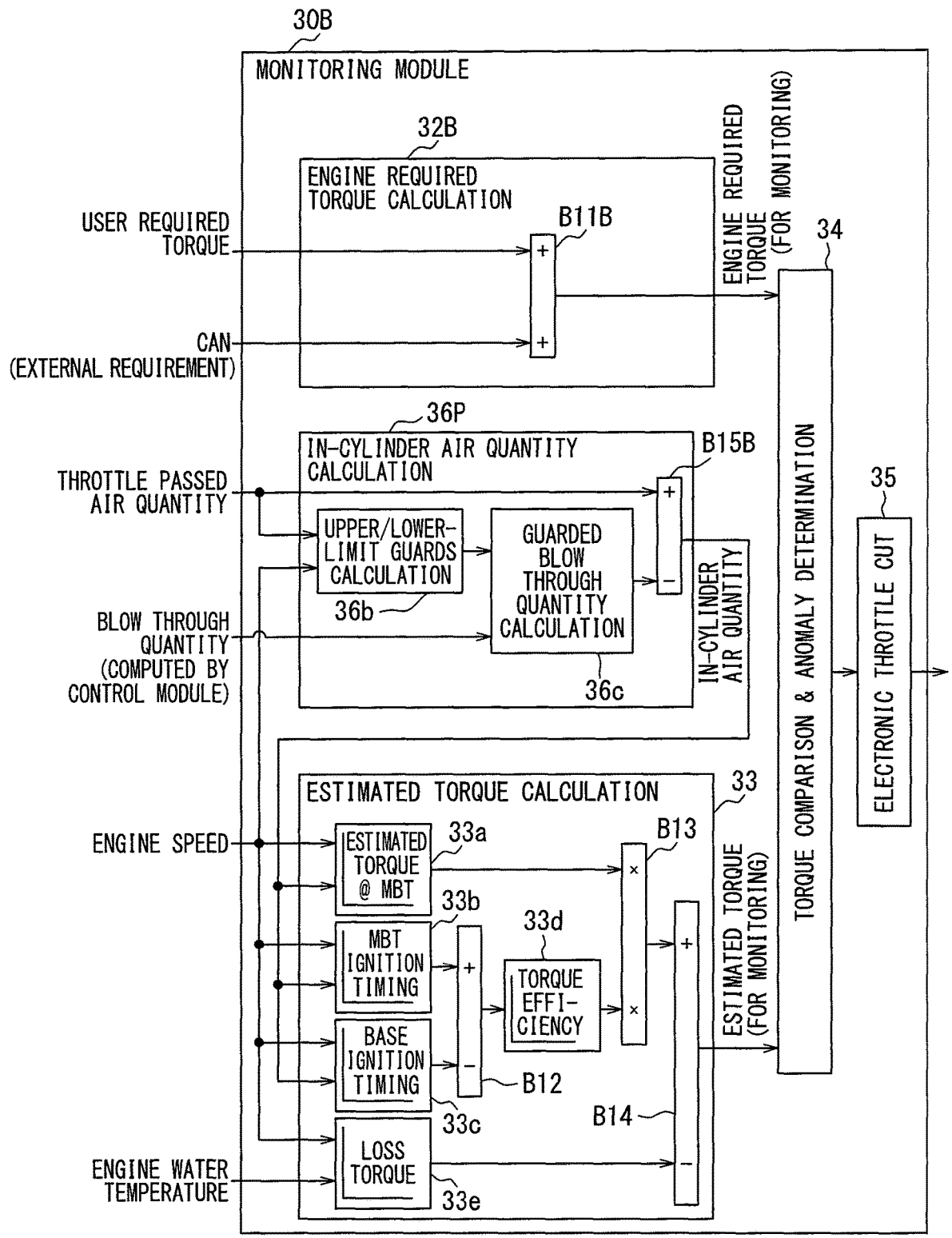
FIG. 13 is a block diagram of a monitoring module in a third embodiment.

Meanwhile, a monitoring module 30B in the present embodiment shown in FIG. 13 does not calculate a blow through state amount by itself but acquires a blow through state amount calculated at the control module 20 and the monitoring module 30 uses the acquired blow through state amount to compute an estimated torque. Specifically, a blow through quantity calculated by the blow through quantity for control calculation unit 221b shown in FIG. 3 is inputted to the input guarantee portion 31 shown in FIG. 1. The input guarantee portion 31 checks data representing a blow through quantity for normality. A blow through quantity guaranteed as the result of check by the input guarantee portion 31 is inputted to an in-cylinder air quantity for monitoring calculation unit 36P shown in FIG. 13.

The in-cylinder air quantity for monitoring calculation unit 36P has functions of an upper/lower-limit guards calculation unit 36b, a guarded blow through quantity calculation unit 36c, and a computation unit B15B.

The upper/lower-limit guards calculation unit 36b calculates upper/lower-limit guards based on an engine speed and a throttle passed air quantity (intake air quantity). Upper/lower-limit guards refer to an upper-limit blow through quantity that is an upper limit of a blow through quantity and a lower-limit blow through quantity that is a lower limit of a blow through quantity. With a higher engine speed and with a larger intake air quantity, an upper-limit blow through quantity is calculated as a larger value. With a lower engine speed and with a smaller intake air quantity, a lower-limit blow through quantity is calculated as a smaller value.

The guarded blow through quantity calculation unit 36c compares a guaranteed blow through quantity calculated by the blow through quantity for control calculation unit 221b with upper/lower-limit guards for magnitude. The guarded blow through quantity calculation unit 36c calculates a value of blow through quantity as a lower-limit blow through quantity when the blow through quantity is small and smaller than a lower-limit blow through quantity and calculates a value of blow through quantity as an upper-limit blow through quantity when the blow through quantity is large and larger than an upper-limit blow through quantity. That is, a guarded blow through quantity is calculated with a blow through quantity acquired from the control module 20 limited to within a predetermined range.

The computation unit B15B subtracts a blow through quantity calculated by the guarded blow through quantity calculation unit 36c from a throttle passed air quantity calculated by the monitoring module 30B to compute an in-cylinder air quantity for monitoring. A thus computed in-cylinder air quantity is used in computation of an estimated torque by the estimated torque computation unit 33 as in FIG. 5.

Figure 14:
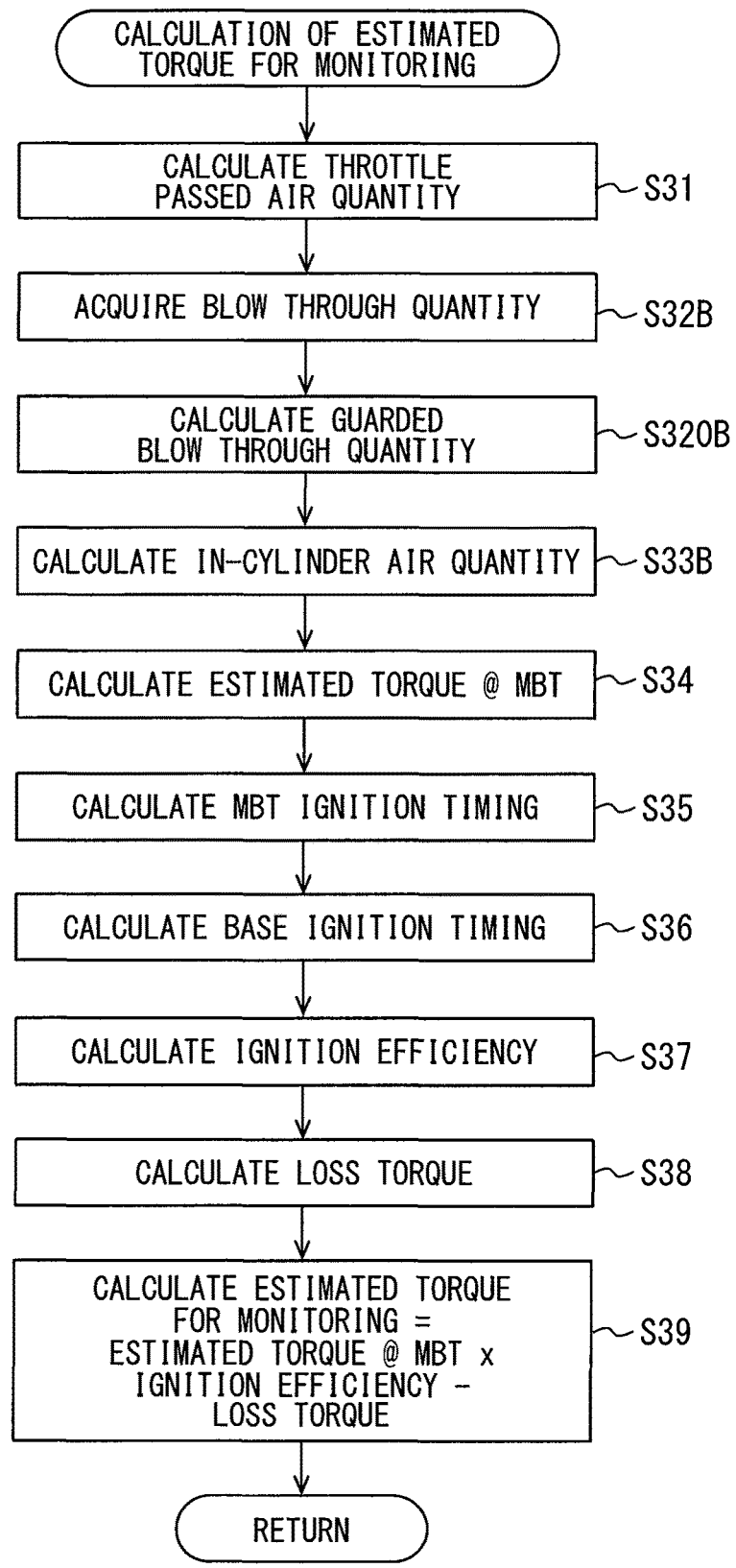
FIG. 14 is a flowchart illustrating a procedure for the estimated torque for monitoring calculation processing shown in FIG. 13.

In the present embodiment, the processing of S32 and S33 shown in FIG. 9 is changed to processing of S32B, S320B, and S33B shown in FIG. 14. At S32B, as mentioned above, the monitoring module 30 acquires a blow through quantity calculated by the control module 20. At S320B, the upper/lower-limit guards calculation unit 36b and the guarded blow through quantity calculation unit 36c calculate a guarded blow through quantity. At S33B, the computation unit B15B calculates an in-cylinder air quantity. When executing the processing of S32, the monitoring module 30B is equivalent to an "acquisition unit" that acquires a blow through state amount calculated by the blow through quantity for control calculation unit 221b.

In short, in the monitoring module 30 in the first embodiment, an in-cylinder air quantity is taken as a blow through state amount used to compute an estimated torque. In the monitoring module 30B in the present embodiment, meanwhile, a blow through quantity acquired from the control module 20 is taken as a blow through state amount used to compute an estimated torque.

According to the present embodiment, as mentioned above, the control module 20 includes the blow through quantity for control calculation unit 221b that calculates a blow through state amount used to compute a target control amount. The monitoring module 30B includes an acquisition unit (S32B) that acquires a blow through state amount calculated by the blow through quantity for control calculation unit 221b and uses a blow through state amount acquired by the acquisition unit to compute an estimated torque. According to the foregoing, a blow through state amount calculated at the control module 20 can be utilized to compute an estimated torque for monitoring.

While varied data used in computation by the monitoring module 30B is guaranteed by the input guarantee portion 31, varied data used in computation by the control module 20 is not guaranteed. For this reason, data on blow through state amount acquired from the control module 20 is more possibly damaged than data on blow through state amount calculated by the monitoring module 30, 30A in the first or second embodiment.

In consideration of this regard, in the present embodiment, when a blow through state amount acquired by the acquisition unit is out of a predetermined range, the monitoring module 30B limits a blow through state amount used to compute an estimated torque to an upper limit or a lower limit of the predetermined range. For this reason, even when acquired data on blow through state amount is damaged, a blow through state amount used to compute an estimated torque for monitoring is limited to an upper limit or a lower limit; therefore, degradation in torque anomaly monitoring accuracy caused by damaged data can be suppressed as compared with cases where this limitation is not applied.

Other Embodiments

The disclosure of the present specification is not limited to the embodiments taken here as examples. The disclosure includes the embodiments taken here as examples and modifications by those skilled in the art based on those embodiments. For example, the disclosure is not limited to a combination of parts and/or elements described in relation to the above-mentioned embodiments. The disclosure can be implemented by various combinations. The disclosure may have an additional portion that can be added to the above-mentioned embodiments. The disclosure includes what is obtained by omitting a part and/or an element of the above-mentioned embodiment. The disclosure includes replacement or a combination of parts and/or elements between one embodiment and another embodiment. The disclosed technical scope is not limited to the technical scopes described in relation to the above-mentioned embodiments. It should be understood that some of disclosed technical scopes are indicated by a description of CLAIMS and include all the modifications within the meaning and scope equivalent to a description of CLAIMS.

In the second embodiment, a degree (degree of blow through) to which intake air blows through out of the exhaust port 90out is taken as a blow through state amount used in computation of an estimated torque by the monitoring module 30A. Specifically, a ratio (blow through efficiency) of an in-cylinder air quantity to a throttle passed air quantity (intake air quantity) is used as a degree of blow through. However, any value can be used as a degree of blow through to compute an estimated torque as long as the value is correlated with a ratio of an in-cylinder air quantity and a blow through quantity. For example, a ratio of a blow through quantity to an intake air quantity may be used as a degree of blow through, a ratio of a blow through quantity to an in-cylinder air quantity may be used as a degree of blow through, and a reciprocal of these ratios may be used as a degree of blow through.

The internal combustion engine control system (ECU 10) in each of the above-mentioned embodiments is applied to an internal combustion engine equipped with a valve adjusting device and a supercharger but is also applicable to an internal combustion engine not equipped with a valve adjusting device and applicable to an internal combustion engine not equipped with a supercharger.

In each of the above-mentioned embodiments, an operation speed of the monitoring module 30 is lower than an operation speed of the control module 20. Specifically, check processing speed of the input guarantee portion 31 produces a bottleneck and as a result, operation speeds of the engine required torque computation unit 32 and the estimated torque computation unit 33 are lower than an operation speed of the engine required torque calculation unit 21. Unlike the foregoing, an operation speed of the monitoring module 30 may be equal to an operation speed of the control module 20.

In each of the above-mentioned embodiments, the control storage area 20m and the monitoring storage area 30m are established in the storage area in the single common memory 11m. Instead, the ECU 10 may be provided with a plurality of memories and a storage area in a first memory may be established as a control storage area with a storage area in a second memory being established as a monitoring storage area.

In each of the above-mentioned embodiments, the single common MCU 11 includes the control storage area 20m and the monitoring storage area 30m. Instead, the ECU 10 may be provided with a plurality of MCUs and configured such that a first MCU has a control storage area and a second MCU has a monitoring storage area.

In the monitoring module 30 in the first embodiment, a reserve torque is reflected in an engine required torque calculated by the engine required torque computation unit 32 and a correction amount of ignition timing by knock learning is not reflected in an estimated torque calculated by the estimated torque computation unit 33. Instead, a reserve torque may be not reflected in an engine required torque calculated by the engine required torque computation unit 32 and a correction amount of ignition timing by knock learning, that is, the above-mentioned knock learning amount may be reflected in an estimated torque calculated by the estimated torque computation unit 33.

In each of the above-mentioned embodiments, the ECU 10 is provided with a detection circuit that detects a driving current or voltage outputted from an ignition driving IC and the control module 20 executes knock learning control using a detection value from the detection circuit. Instead, knock learning control may be exercised without use of the above-mentioned detection value by considering a command signal outputted from the driving signal output portion 22 to the ignition driving IC 12 as an actual ignition timing.

Figure 2:
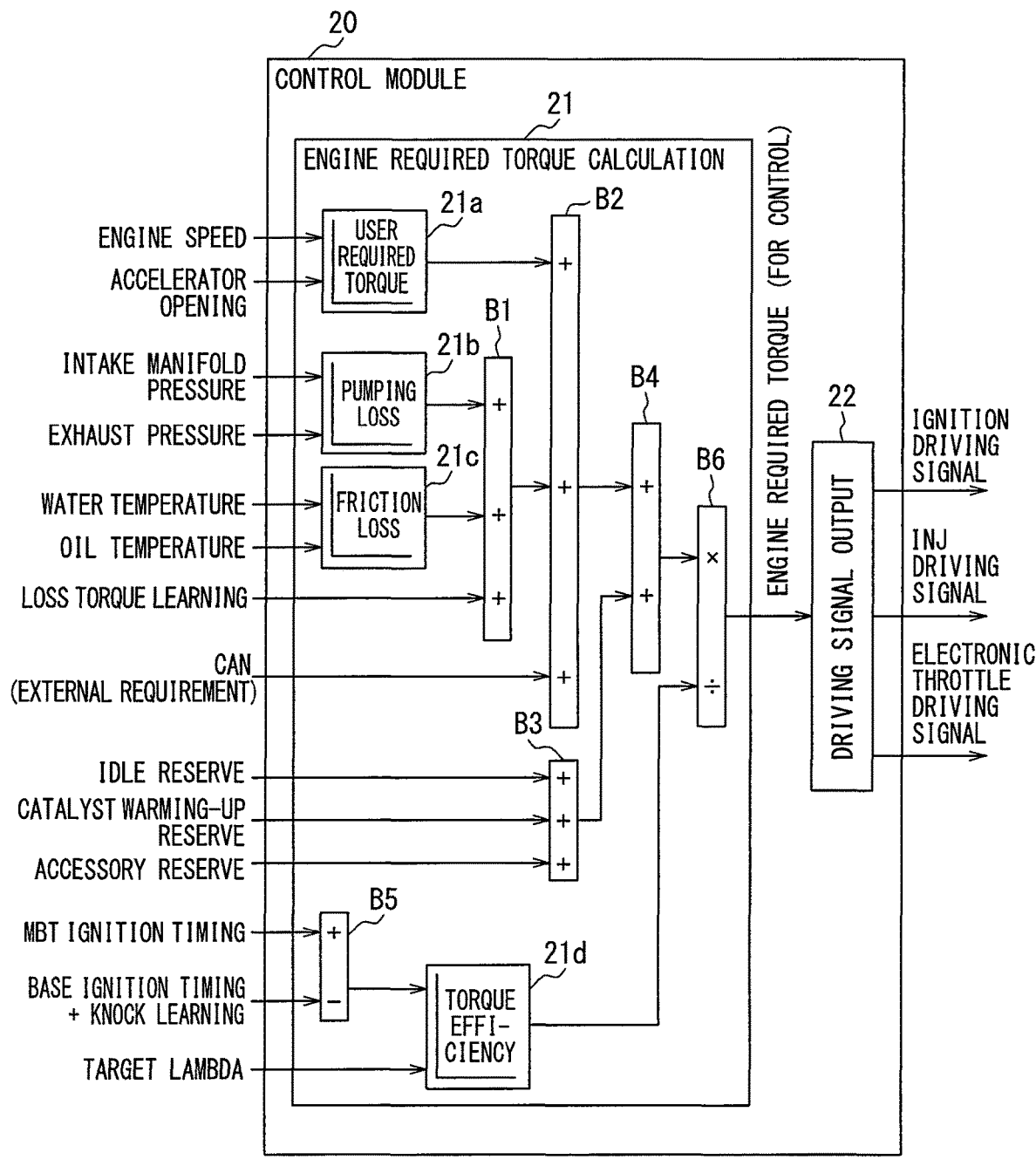
FIG. 2 is a block diagram of a control module shown in FIG. 1.

The computation unit B3 shown in FIG. 2 adds an idle reserve, a catalyst warming-up reserve, and an accessory reserve to compute a reserve torque and outputs the obtained reserve torque to the computation unit B4. Instead, the maximum values of idle reserve, catalyst warming-up reserve, and accessory reserve may be used as reserve torques to perform computation and a result of this computation may be outputted to the computation unit B4.

In the first embodiment, all of an idle reserve, a catalyst warming-up reserve, and an accessory reserve are used to calculate a reserve torque. Instead, at least one of these reserves may be used to calculate a reserve torque.

In the first embodiment, as shown in FIG. 3, both a catalyst warming-up required torque and an idle required torque are added to a user required torque to calculate an engine required torque. Instead, the larger required torque of a catalyst warming-up required torque and an idle required torque may be added to a user required torque to calculate an engine required torque.

In each of the above-mentioned embodiments, an in-vehicle internal combustion engine is controlled by the ECU 10. Instead, a stationary, rather than in-vehicle, internal combustion engine may be controlled by the ECU 10.

The invention claimed is:

1. An internal combustion engine control system comprising:
   an control arithmetic unit configured, by using a control storage area, to perform computation to compute a target control amount that is a target value of control amount, by which a state of combustion of an internal combustion engine is controlled, according to a user required torque that is a driving torque of the internal combustion engine required by a user; and
   a monitoring arithmetic unit configured, by using a monitoring storage area different from the control storage area, to perform computation and to monitor presence or absence of a torque anomaly state in which an estimated torque is deviated from an engine required torque by a predetermined amount or more, the estimated torque being an estimated value of actual torque of the internal combustion engine, the engine required torque being required of the internal combustion engine, wherein
   the monitoring arithmetic unit is configured to compute the estimated torque by using a blow through state amount, wherein
   the blow through state amount is
      a blow through quantity that is a quantity of intake air blowing through out of an exhaust port in an intake stroke of the internal combustion engine,
      a degree to which intake air blows through out of the exhaust port, or
      an in-cylinder air quantity that is a quantity of air filled into a combustion chamber of the internal combustion engine, wherein
   the control arithmetic unit includes a control blow-through-state calculation unit configured to calculate the blow through state amount used to compute the target control amount,
   the monitoring arithmetic unit includes an acquisition unit configured to acquire the blow through state amount calculated by the control blow-through-state calculation unit,
   the monitoring arithmetic unit is configured to compute the estimated torque by using the blow through state amount acquired by the acquisition unit,
   when the blow through state amount acquired by the acquisition unit is out of a predetermined range, the monitoring arithmetic unit is configured to limit the blow through state amount used to compute the estimated torque to an upper limit or a lower limit of the predetermined range,
   the monitoring arithmetic unit is configured to perform computation using a signal acquired from an input processing circuit, and
   the monitoring arithmetic unit includes an input guarantee portion configured to check whether data of the signal acquired from the input processing circuit is normal.

2. The internal combustion engine control system according to claim 1, wherein
   the monitoring arithmetic unit includes a monitoring blow-through-state calculation unit configured to calculate the blow through state amount used to compute the estimated torque.

3. The internal combustion engine control system according to claim 2, wherein
   the monitoring blow-through-state calculation unit is configured to calculate the blow through state amount based on at least one of
   a quantity of air passing through a throttle valve installed in an intake pipe,
   an overlap period during which a valve opening period of an intake valve and a valve opening period of an exhaust valve overlap with each other,
   an intake pressure,
   an exhaust pressure, and
   an engine speed.

4. The internal combustion engine control system according to claim 1, wherein
   an operation cycle of the monitoring arithmetic unit is longer than an operation cycle of the control arithmetic unit.

5. The internal combustion engine control system according to claim 1, wherein
   the input guarantee portion is configured to check data acquired from outside the monitoring arithmetic unit for normality.

6. The internal combustion engine control system according to claim 1, wherein
   the input guarantee portion is configured to perform parity check on the data of the signal to check whether the data of the signal is normal, and
   the input guarantee portion is configured to perform at least one of data restoration, data re-acquisition, and data discard, when the data is abnormal.

7. The internal combustion engine control system according to claim 1, further comprising:
   a CPU check circuit configured to check whether information stored in at least one of the control storage area and the monitoring storage area is normal.

8. The internal combustion engine control system according to claim 1, wherein
   the control arithmetic unit is configured to perform computation using the signal acquired from the input processing circuit without checking whether the data of the signal acquired from the input processing circuit is normal.

9. The internal combustion engine control system according to claim 1, wherein
   the monitoring arithmetic unit is configured to compute the engine required torque based on the data checked by the input guarantee portion.

10. An internal combustion engine control system comprising:
   a computer and storage memory storing instructions such that when the instructions are executed by computer, the computer is at least configured to:
   perform a control arithmetic by using a control storage area to perform computation to compute a target control amount that is a target value of control amount, by which a state of combustion of an internal combustion engine is controlled, according to a user required torque that is a driving torque of the internal combustion engine required by a user; and perform a monitoring arithmetic by using a monitoring storage area different from the control storage area to perform computation and monitor presence or absence of a torque anomaly state in which an estimated torque is deviated from an engine required torque by a predetermined amount or more, the estimated torque being an estimated value of actual torque of the internal combustion engine, the engine required torque being required of the internal combustion engine, wherein to perform the monitoring arithmetic, the computer is configured to compute the estimated torque by using a blow through state amount, wherein the blow through state amount is
  a blow through quantity that is a quantity of intake air blowing through out of an exhaust port in an intake stroke of the internal combustion engine,
  a degree to which intake air blows through out of the exhaust port, or
  an in-cylinder air quantity that is a quantity of air filled into a combustion chamber of the internal combustion engine, wherein to perform the control arithmetic, the computer is further configured to calculate the blow through state amount used to compute the target control amount, to perform the monitoring arithmetic, the computer is further configured to acquire the blow through the calculated state amount, to perform the monitoring arithmetic, the computer is further configured to compute the estimated torque by using the acquired blow through state amount, when the acquired blow through state amount is out of a predetermined range and to perform the monitoring arithmetic, the computer is further configured to limit the blow through state amount used to compute the estimated torque to an upper limit or a lower limit of the predetermined range, to perform the monitoring arithmetic, the computer is further configured to perform computation using a signal acquired from an input processing circuit, and to perform the monitoring arithmetic, the computer is further configured to check whether data of the signal acquired from the input processing circuit is normal to thereby guarantee the data.

11. The internal combustion engine control system according to claim 10, wherein
  to perform the monitoring arithmetic, the computer is further configured to calculate the blow through state amount used to compute the estimated torque.

12. The internal combustion engine control system according to claim 11, wherein
  to perform the monitoring arithmetic, the computer is further configured to calculate the blow through state amount based on at least one of
    a quantity of air passing through a throttle valve installed in an intake pipe,
    an overlap period during which a valve opening period of an intake valve and a valve opening period of an exhaust valve overlap with each other,
    an intake pressure,
    an exhaust pressure, and
    an engine speed.

13. The internal combustion engine control system according to claim 10, wherein
  an operation cycle for performing the monitoring arithmetic is longer than an operation cycle for performing the control arithmetic.

14. The internal combustion engine control system according to claim 10, wherein
  to perform the monitoring arithmetic, the computer is further configured to check data acquired from outside the computer for normality.

15. The internal combustion engine control system according to claim 10, wherein in order to perform the monitoring arithmetic,
  the computer is further configured to perform parity check on the data of the signal to check whether the data of the signal is normal, and
  the computer is further configured to perform at least one of data restoration, data re-acquisition, and data discard, when the data is abnormal.

16. The internal combustion engine control system according to claim 10, further comprising:
  a CPU check circuit configured to check whether information stored in at least one of the control storage area and the monitoring storage area is normal.

17. The internal combustion engine control system according to claim 10, wherein to perform the control arithmetic,
  the computer is further configured to perform computation using the signal acquired from the input processing circuit without checking whether the data of the signal acquired from the input processing circuit is normal.

18. The internal combustion engine control system according to claim 10, wherein in order to perform the monitoring arithmetic,
  the computer is configured to compute the engine required torque based on the checked data of the signal acquired from the input processing circuit.

\* \* \* \* \*